Nov. 15, 1966  A. E. GODIN  3,285,600
CARD PUNCHING AND REPRODUCING MACHINE
Filed Oct. 14, 1964  17 Sheets-Sheet 1

Inventor:
André Emile Godin
By Baldwin & Wright
Attorneys

Nov. 15, 1966  A. E. GODIN  3,285,600
CARD PUNCHING AND REPRODUCING MACHINE
Filed Oct. 14, 1964  17 Sheets-Sheet 3

Inventor:
André Emile Godin
BY Baldwin & Wight
Attorneys

Nov. 15, 1966 A. E. GODIN 3,285,600
CARD PUNCHING AND REPRODUCING MACHINE
Filed Oct. 14, 1964 17 Sheets-Sheet 4

Inventor:
André Emile Godin
By Baldwin & Wight
Attorneys

Nov. 15, 1966  A. E. GODIN  3,285,600
CARD PUNCHING AND REPRODUCING MACHINE
Filed Oct. 14, 1964  17 Sheets-Sheet 5
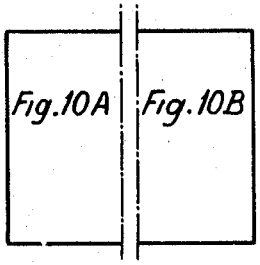
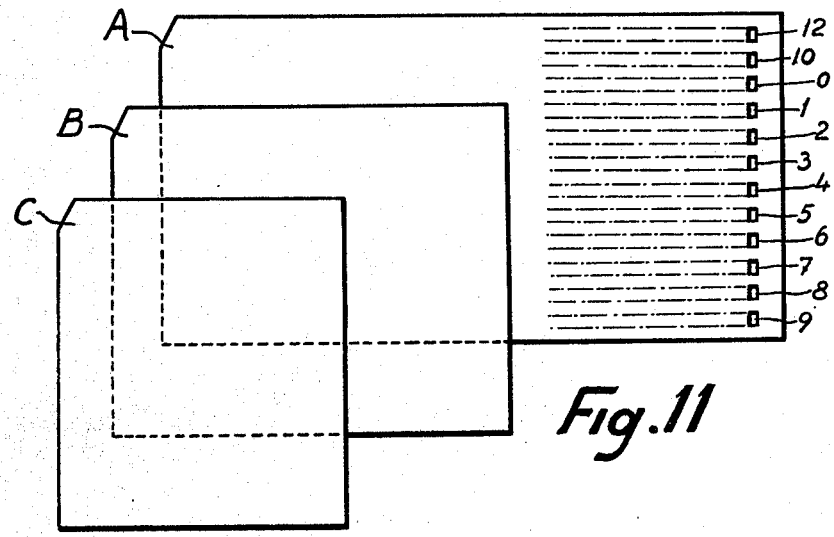
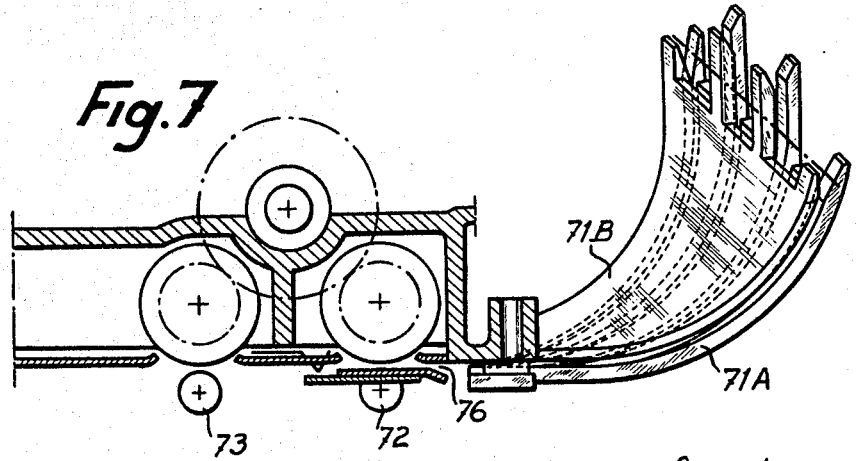
Inventor:
André Emile Godin
BY Baldwin & Wight
Attorneys

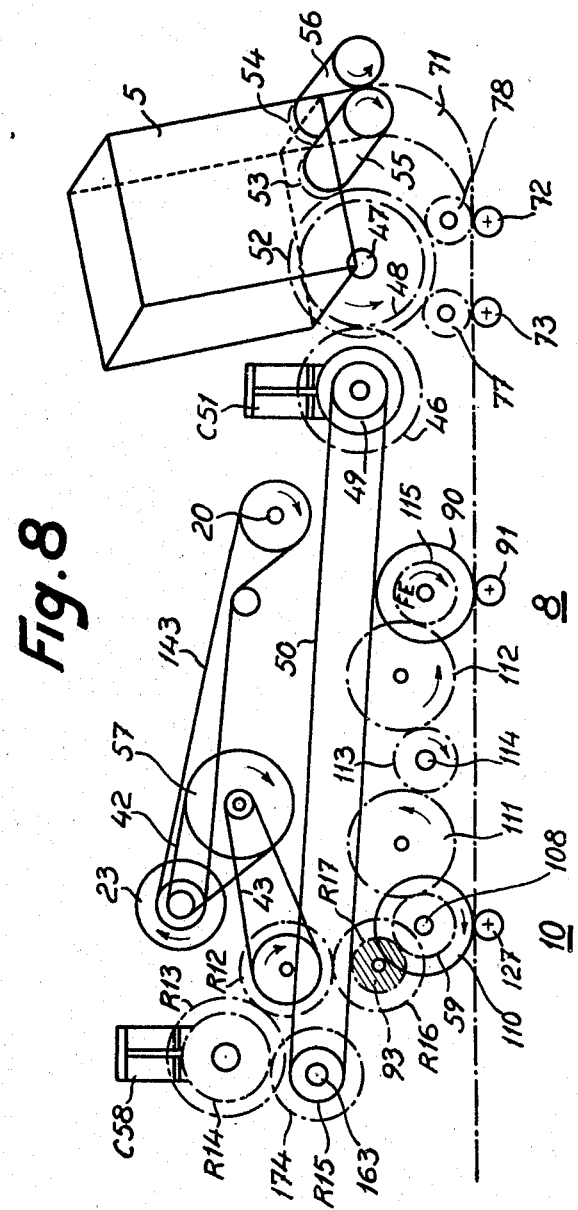

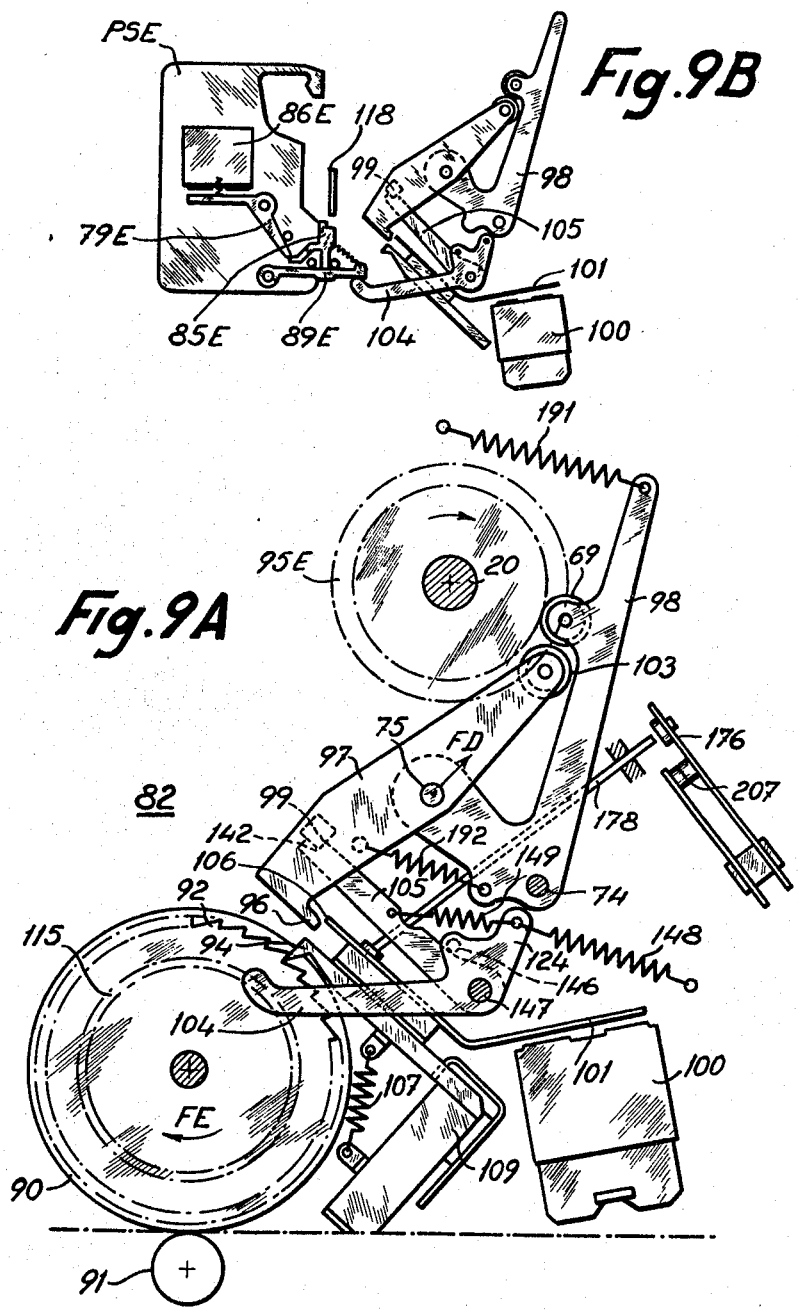

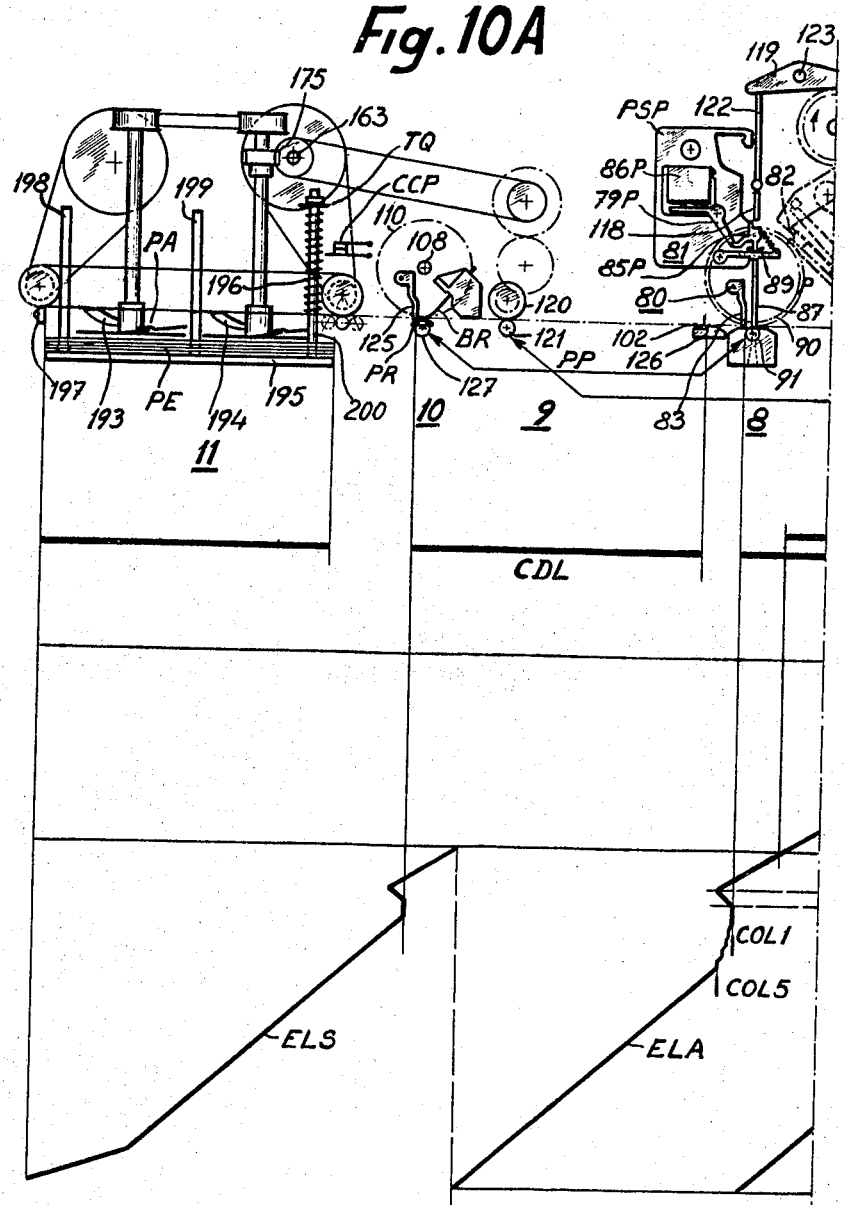

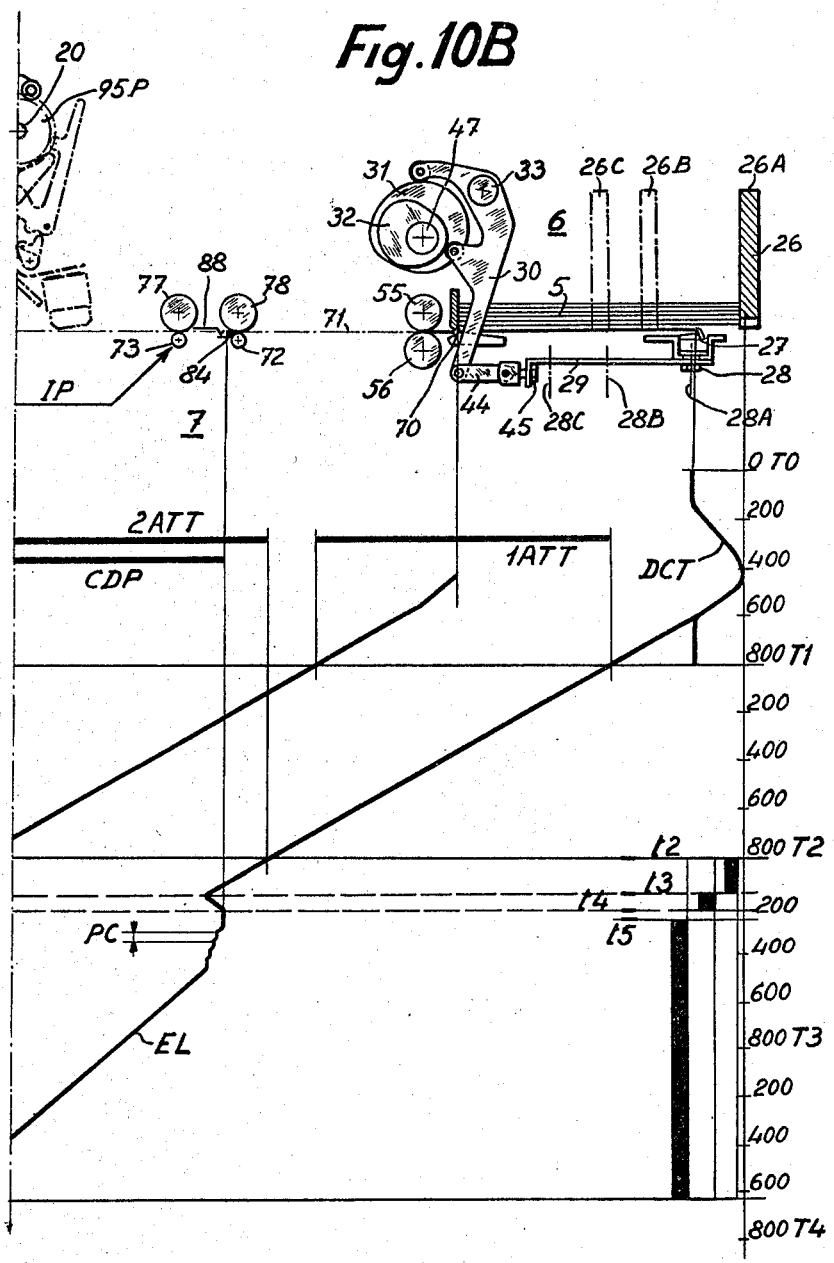

Nov. 15, 1966       A. E. GODIN       3,285,600
CARD PUNCHING AND REPRODUCING MACHINE
Filed Oct. 14, 1964                    17 Sheets-Sheet 10

Inventor:
André Emile Godin
BY Baldwin & Wight
Attorneys

Nov. 15, 1966   A. E. GODIN   3,285,600
CARD PUNCHING AND REPRODUCING MACHINE
Filed Oct. 14, 1964   17 Sheets-Sheet 11
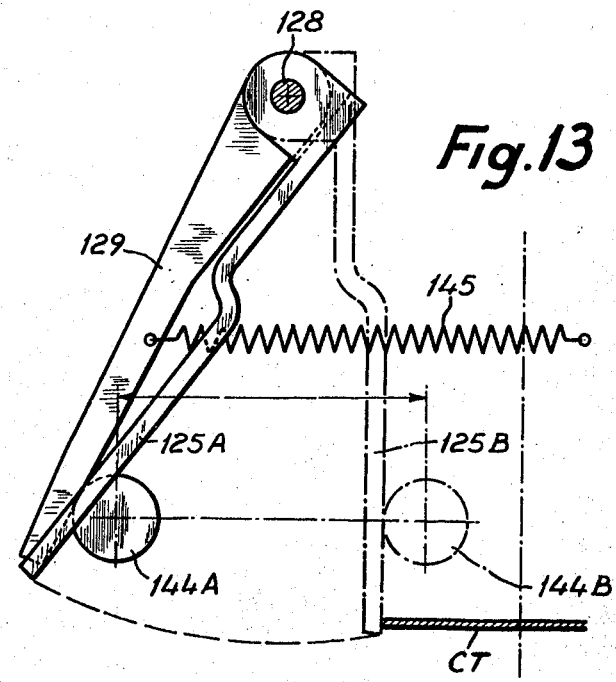
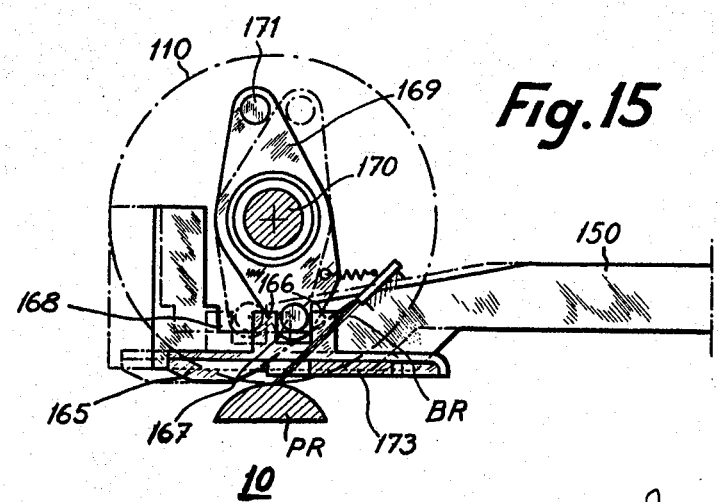
Inventor:
André Emile Godin
BY Baldwin & Wight
Attorneys

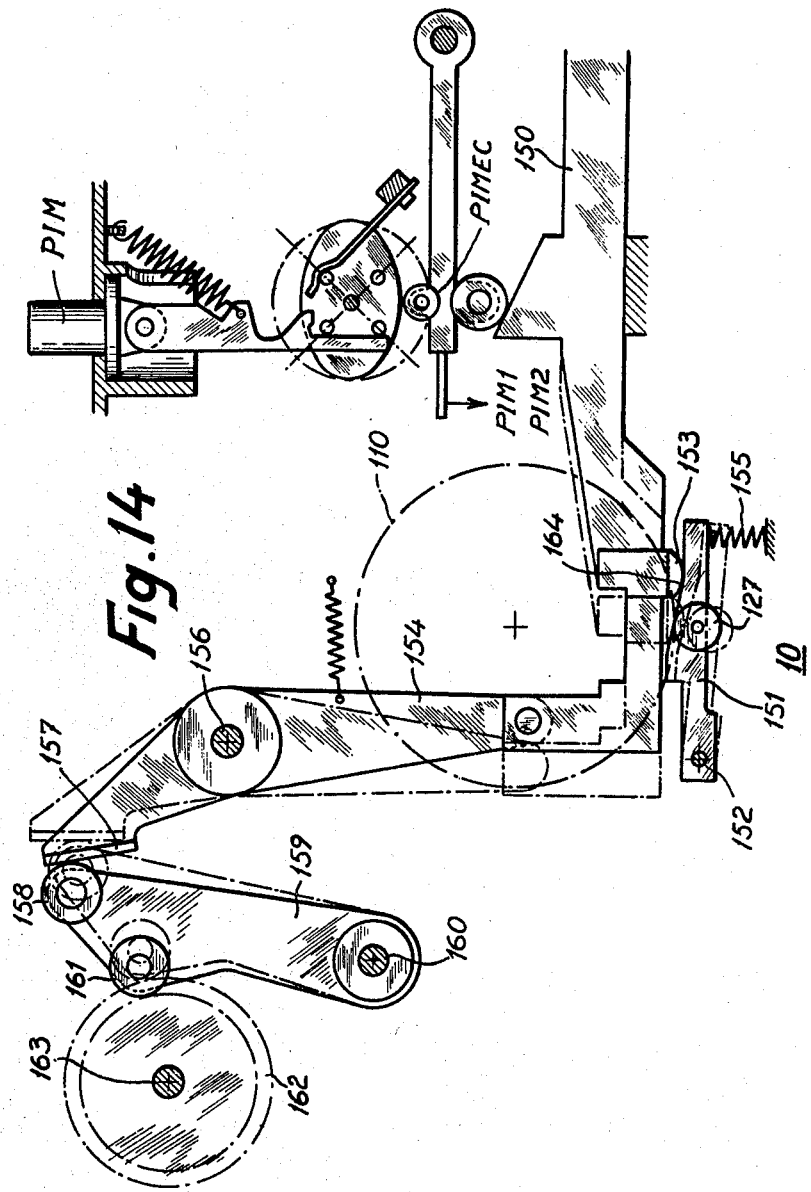

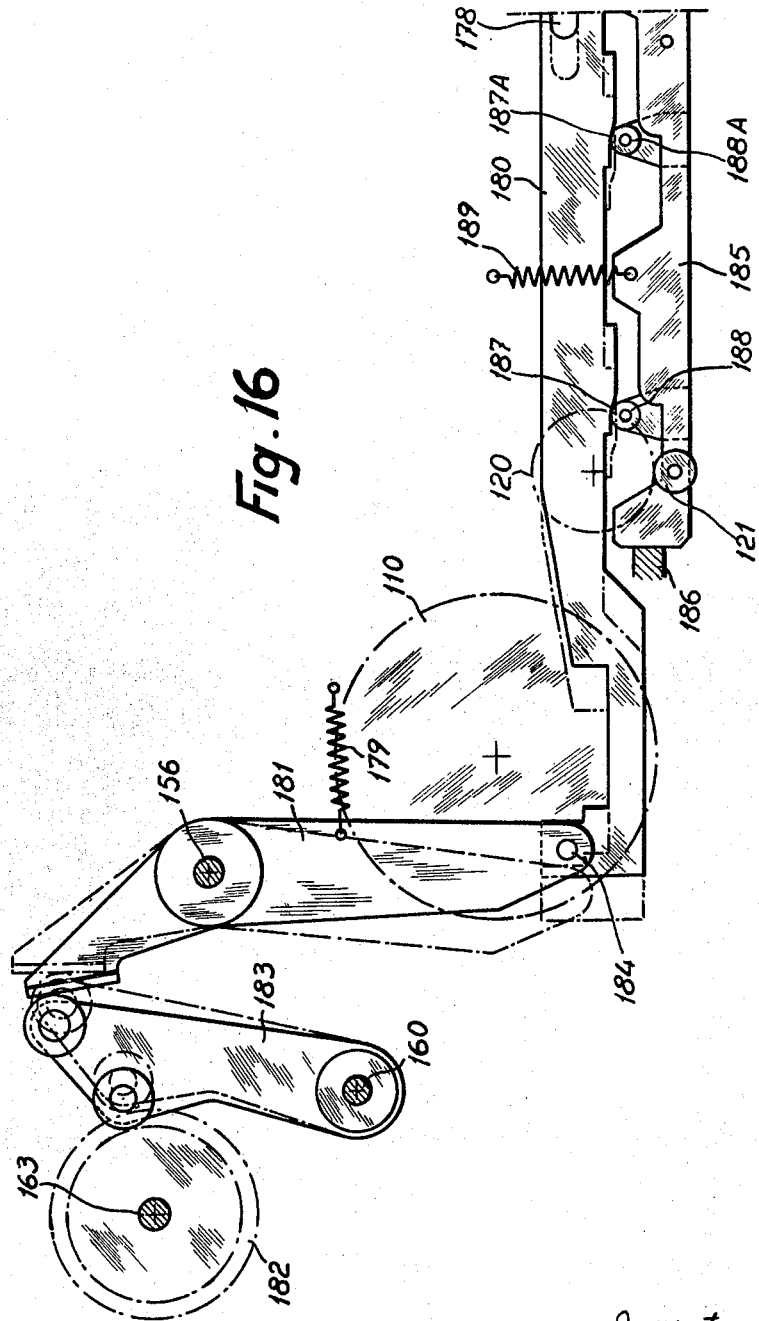

Nov. 15, 1966  A. E. GODIN  3,285,600
CARD PUNCHING AND REPRODUCING MACHINE
Filed Oct. 14, 1964  17 Sheets-Sheet 14

Inventor:
André Emile Godin
By Baldwin & Wright
Attorneys

United States Patent Office 3,285,600
Patented Nov. 15, 1966

3,285,600
CARD PUNCHING AND REPRODUCING
MACHINE
André Emile Godin, Choisy-le-Roi, France, assignor to
Compagnie des Machines Bull (Societe Anonyme),
Paris, France
Filed Oct. 14, 1964, Ser. No. 403,822
Claims priority, application France, Oct. 24, 1963,
951,653
5 Claims. (Cl. 271—10)

The present invention relates to improvements in punching and reproducing machines for recording data by punching in record cards and concerns more particularly machines provided with means for punching data, under the control of a keyboard, and the control of the automatic reproduction of data from one card in another, either with manual control or under the control of a programme. Data to be recorded and control indications may also be transmitted to the said machines, either from data-processing machines, or from devices for reading and translating information recorded in cards or tapes, or again they may be transmitted by means for the long-distance transmission of data.

Automatic punching and reproducing machines of this type are known and are currently employed in mechanographical systems utilising punched cards as information recording media. The present invention concerns more particularly an improved machine provided with means for readily and rapidly adapting it for recording data in record cards for various dimensions. A machine designed in accordance with the invention is particularly adapted for operation at high speed, under very good conditions of operating reliability, and is provided with improved means for rapid programme changing even in the course of the processing of a card. A very high degree of automation for the performance of functions not necessarily requiring the intervention of the operator reduces the fatigue to which the latter is subjected and ensures very high overall performance. A machine designed in accordance with the invention also comprises an assembly of means which afford the operator maximum convenience of use and facilities for checking which minimise the danger of errors in the course of the recording and transcription of data. A machine designed in accordance with the invention is also characterised in that, in the said machine, the processed cards are always advanced longitudinally, that is to say, in the column-by-column direction, and progress along a guide track, in which only one change of direction by helical movement occurs. This particular arrangement makes it possible to provide a machine of reduced overall dimensions in which the card supply magazine is readly accessible and can be readily loaded and in which the cards are advanced towards the extraction mechanism under the action of a weight simply acting by gravity. The helical change of direction of the cards also makes it possible to provide a machine in which the cards are directly presented column-by-column in the successive punching and analysing positions provided along the said track. In addition, the latter is disposed with an inclination which is carefully chosen so as to afford to the operator maximum visibility and convenience for checking the cards in the course of their advance along the track and during the successive phases of their processing. Further advantages and features of the invention will be more readily understood from the following description and with reference to the accompanying drawings, in which:

FIGURE 7 is a diagrammatic drawing showing one construction of the parts for guiding the cards in the helical change of direction;

FIGURE 8 is a diagrammatic drawing showing the mechanical connections for the transmission of the movement from the motor to the main part of the machine;

FIGURE 9A is a diagrammatic drawing of the escape mechanism which controls the advance of the cards in the punching and reading stations of the machine;

FIGURE 9B is a fragmentary view, drawn to a small scale, of the detent mechanism adapted to control the operation of the escape mechanism;

FIGURE 10 is a drawing indicating the assembly of FIGURES 10A and 10B;

Figure 12:
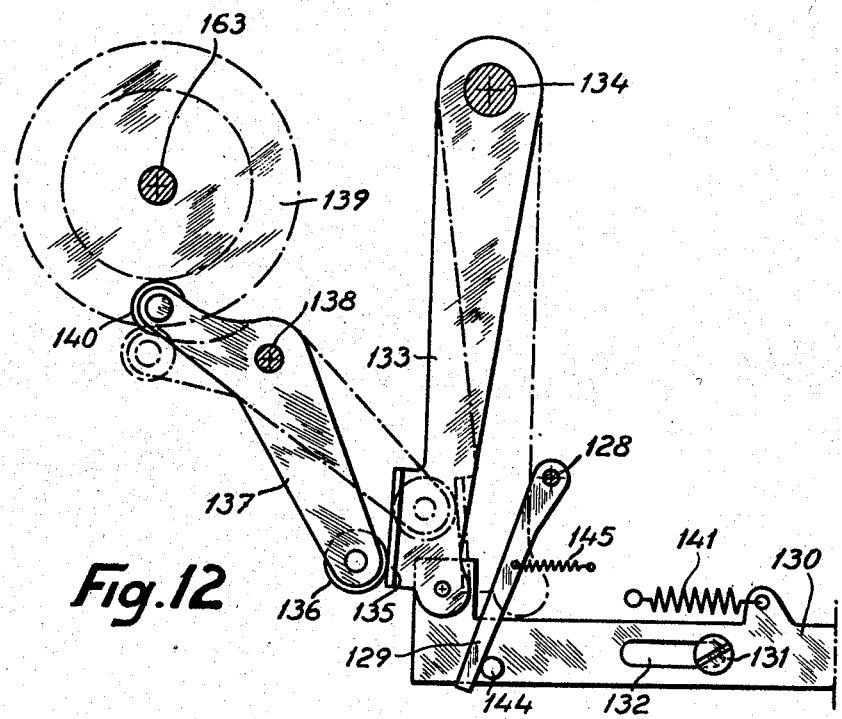
Figure 17A:
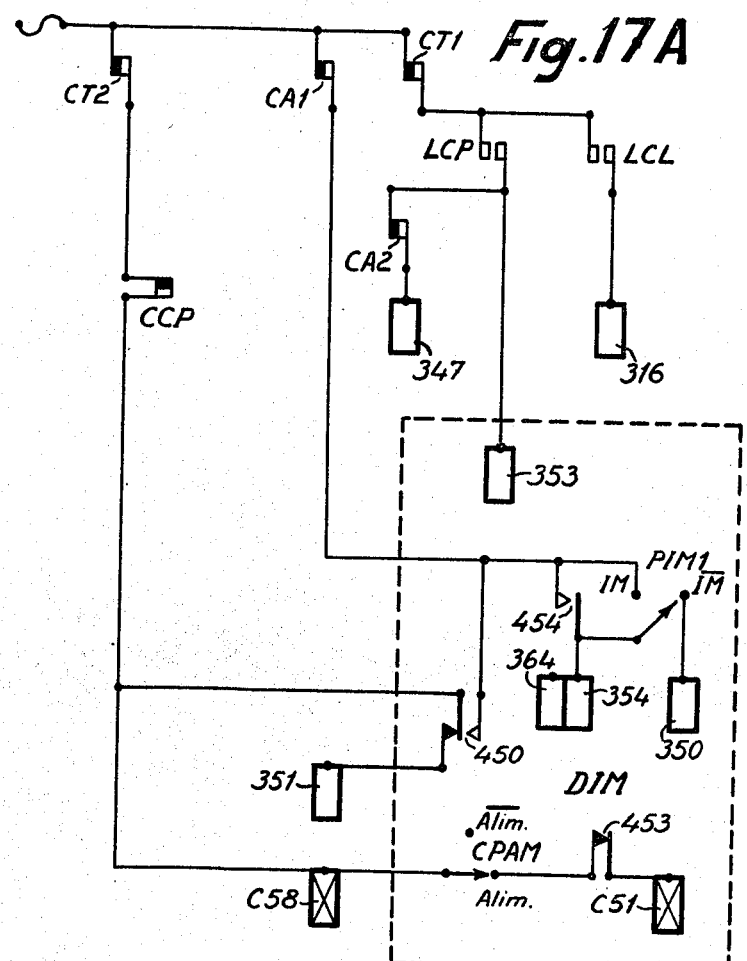
Figure 17B:
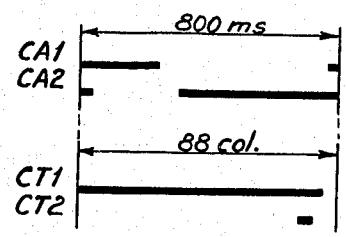
Figure 18B:
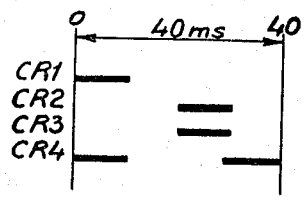
Figure 18A:
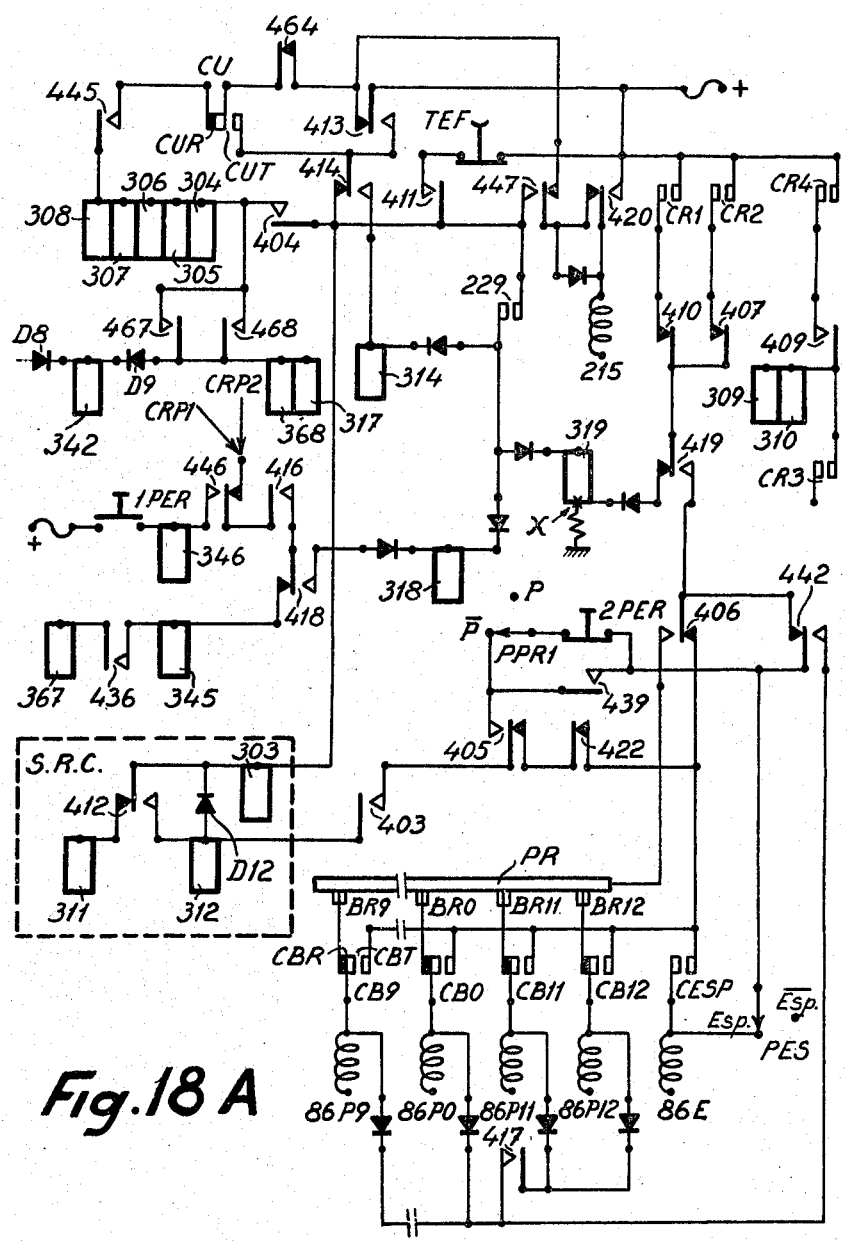
Figure 19:
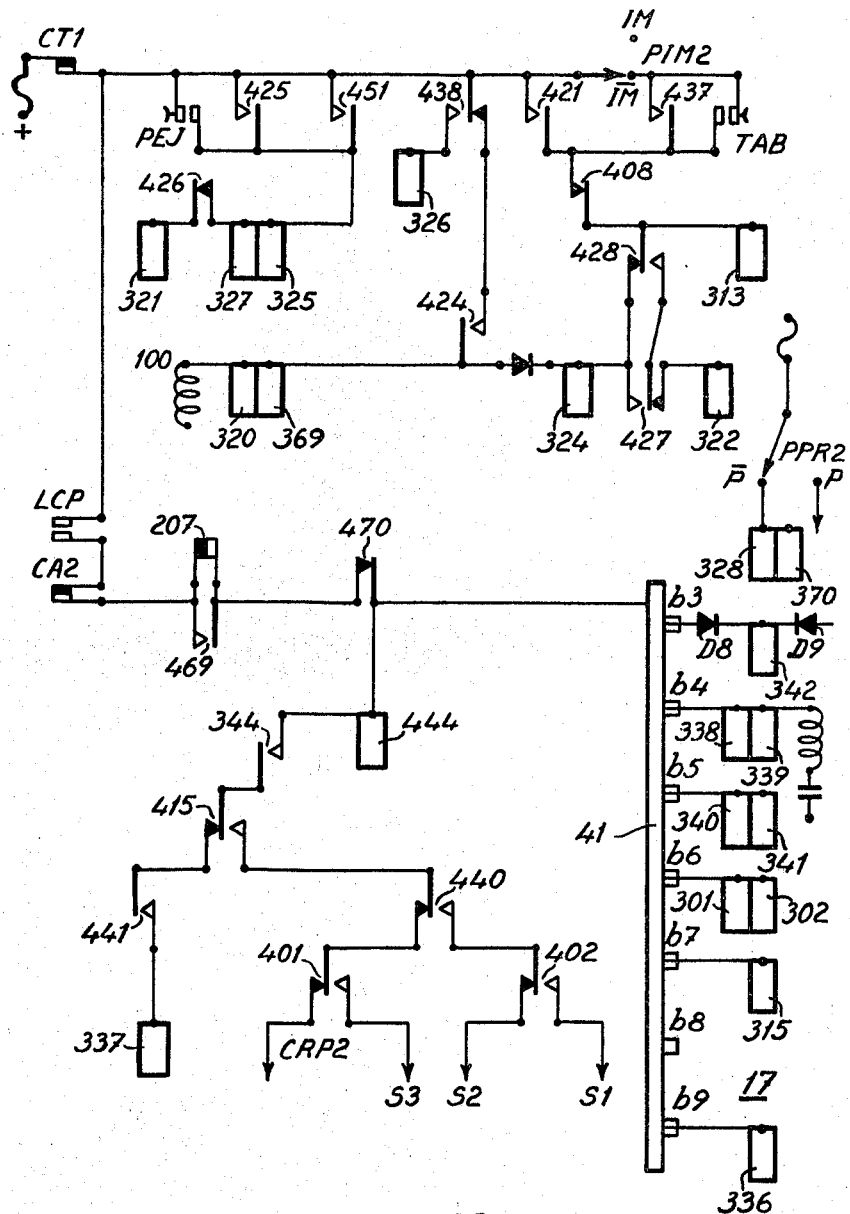
Figure 20:
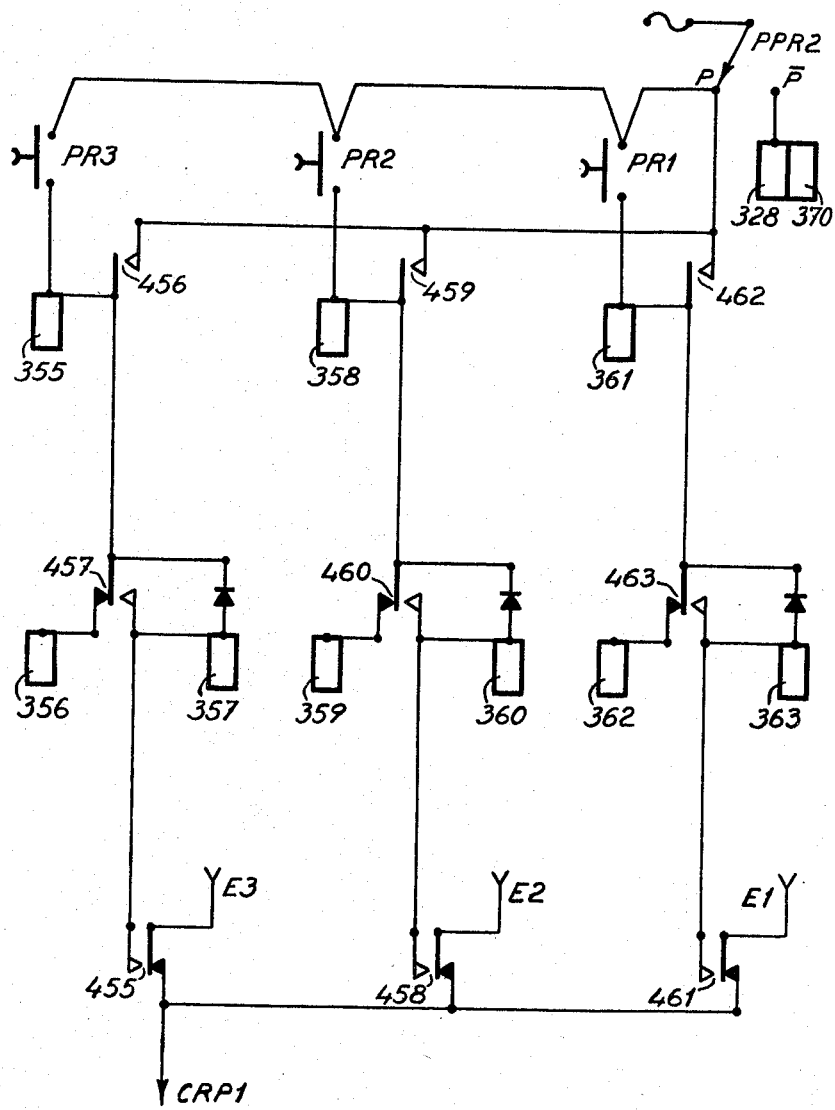

FIGURES 10A and 10B (assembled as indicated in FIGURE 10) are a view of the relative arrangement of the main mechanisms distributed along the track of the machine and a diagram showing various phases of the advance of cards in the course of their processing in the machine;

FIGURE 11 illustrates the relative proportions of the dimensions of three different card sizes for which the described machine may be adapted;

FIGURE 12 is a diagrammatic view of the main parts of the mechanism controlling the intial positioning of the cards in the processing stations;

FIGURE 13 is a diagrammatic view showing the movements and the mode of action of the parts acting on the leading edge of the cards for the initial positioning of the latter in the processing stations;

FIGURE 14 is a diagrammatic view of a part of the mechanism for controlling the movements of the presser rollers co-operating with the devices for driving the cards in the processing stations;

FIGURE 15 is a diagrammatic view of a part of the mechanism for automatically lifting the brushes in the reading station;

FIGURE 16 illustrates a part of the mechanism for controlling the presser rollers acting on the cards in the intermediate stations;

FIGURE 17A is a simplified diagram of the general circuits of the machine;

FIGURE 17B is a diagram showing the instants of the closing of the cam-operated contacts controlling the general circuits;

FIGURE 18A is a diagram illustrating the principle of the circuits for the control of the card punching and advancing operations;

FIGURE 18B is a diagram showing the instants of the closing of the cam-operated contacts co-operating with the circuits for controlling the card punching and advancing operations;

FIGURE 19 illustrates the circuits controlling the positions of the cards and the operations for the automatic tabulation and ejection thereof under the control of a programme device, and FIGURE 20 illustrates the circuits controlling zone-by-zone the automatic data reproduction.

Figure 1:
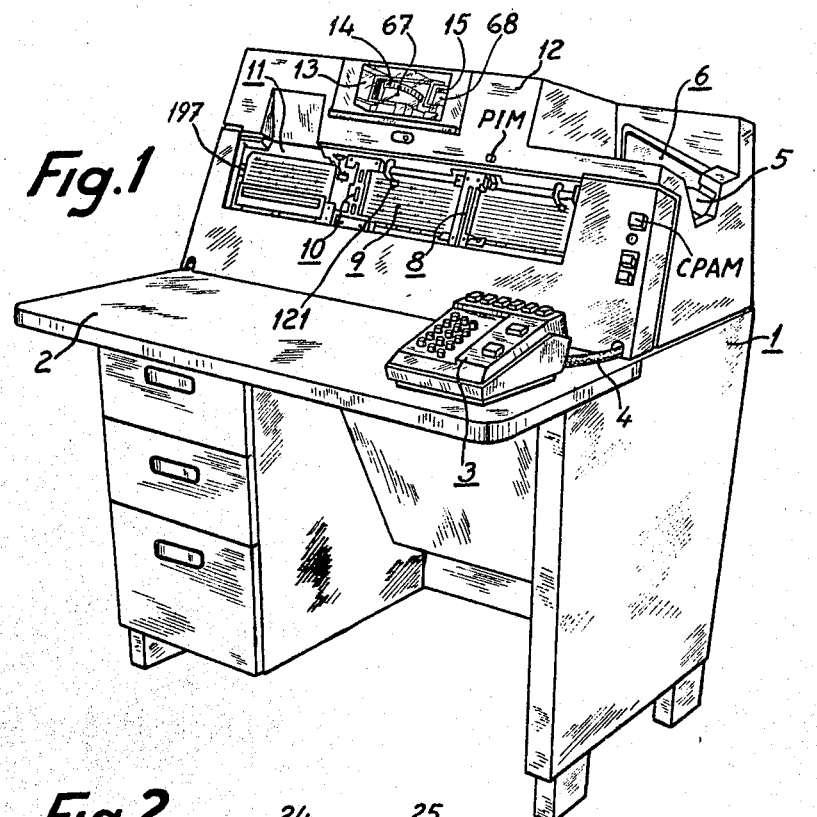
FIGURE 1 is an overall view of the working station of a machine designed in accordance with the invention.
Figure 2:
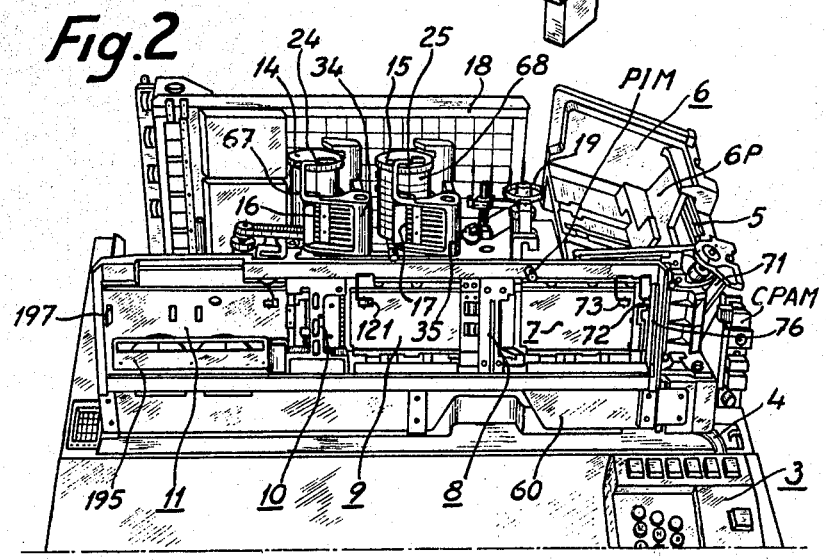
FIGURE 2 is a front view of the mechanisms of the machine, the casings for the protection of the said mechanisms having been removed.
Figure 3:
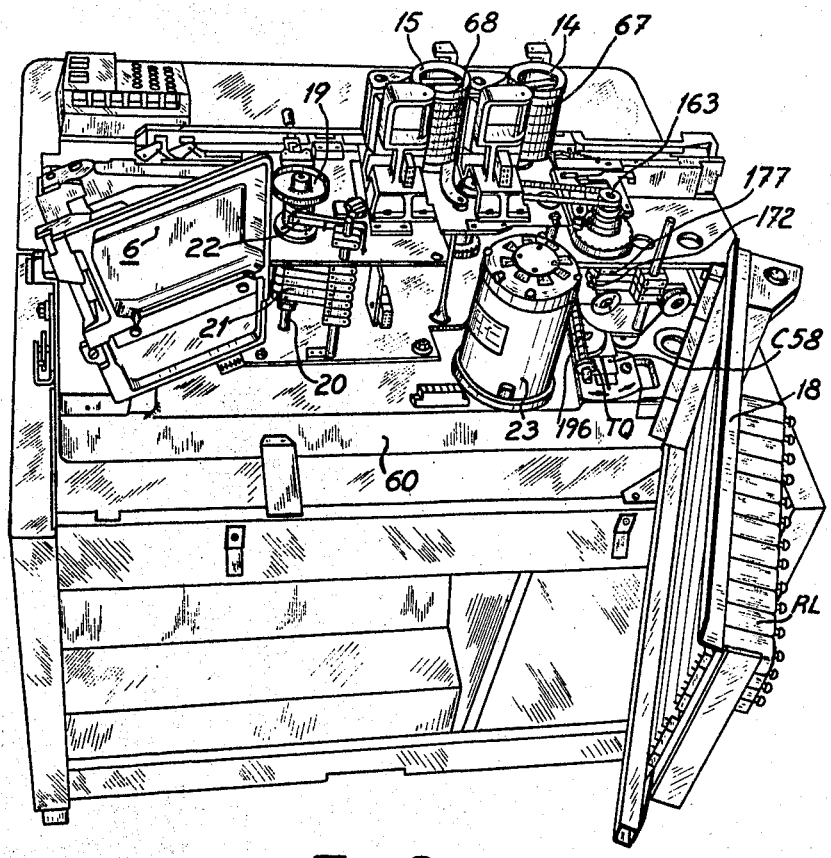
FIGURE 3 is a rear view of the machine, one panel on which relay devices are mounted having been opened to show various parts of the mechanisms.
Figure 4:
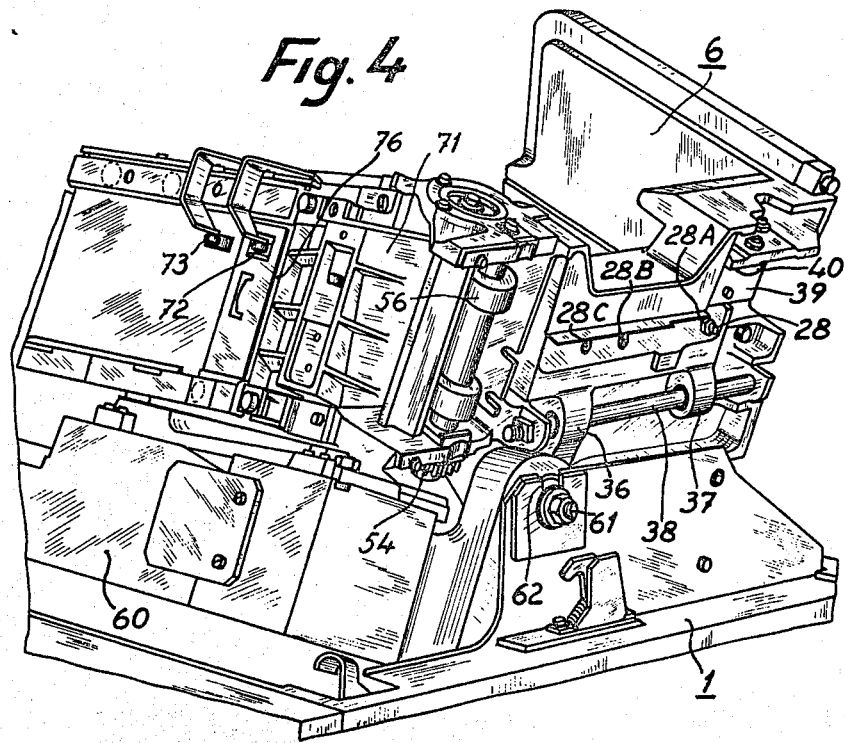
FIGURE 4 is a view of a detail of the card supply magazine with a part of the mechanism for the extraction of the cards.

In the punching and reproducing machine illustrated in FIGURE 1, the card processing mechanisms are assembled in the upper part of a cabinet 1 forming a support for the said mechanisms and provided with casings for the protection of the latter. A forwardly extending part 2 forms a table which receives an electric keyboard 3 and if necessary the basic documents which supply to the operator the data which will be recorded by punching, by way of the keyboard, cards which will be successively fed into the machine. The keyboard 3 is electrically connected to the control circuits of the machine by means of an electric multi-conductor cable 4. The said cable is sufficiently long to enable the operator working on the machine to dispose the keyboard in any place which he considers desirable on the table 2. The machine is provided with a supply magazine 6 in which cards 5 to be processed have been deposited. They are pushed (FIGURE 2) by a presser weight 6P which advances them by gravity, to a position from which they are extracted one-by-one by a knife mechanism which will hereinafter be described, and which engages the said cards one-by-one in the track of the machine along which they are advanced for successive processing. Each card leaving the supply magazine is engaged in a path comprising a helical portion 71 in which the direction of the said card is changed so as to be introduced into a waiting position 7 before being engaged in the punching station 8 (FIGURES 1 and 2), in which information may be recorded therein in the form of perforations. A card leaving the punching station 8 thereafter passes through an intermediate position 9 in which the said card is visible to the operator so that the data punched therein may be visually checked. The card is thereafter engaged in the reading station 10, in which it is scanned, column-by-column, by contact brushes, while the succeeding card is synchronously advanced into the punching station, in which it may receive, by automatic punching, data corresponding to the data scanned in the corresponding columns of the card preceding it. On leaving the reading station, a card is first advanced into an intermediate position in the ejection compartment 11, from which it may be manually extracted for visual checking, and thereafter again deposited therein in order to be taken up and stacked by a mechanism which will also be described in the following. The machine may also be provided at its outlet with a device which, instead of transmitting the processed cards to the stacking mechanism, may transfer them to a selection device or to another machine which may be coupled to the punching machine. The upper part of the casing 12 covering the mechanisms of the machine (FIGURE 1) is provided with a transparent window 13 through which the operator can visually check the position of two drum mechanisms 14 and 15 (FIGURES 1 and 2), both of which may carry programme cards. Scanning brushes 16 and 17 are disposed (FIGURE 2) to scan, as will hereinafter be described, the cards which may be mounted on the said drums. Disposed at the rear of the mechanism (FIGURES 2 and 3) is a panel 18 on which are mounted all the relays RL of the electric circuits of the machine. A graduated drum 19 is provided to check the relative position and the adjustments of various mechanical members and the adjustments of cam-operated contacts which control electric circuits of the machine. The graduated drum 19 is mounted (FIGURE 3) on a shaft 20 on which are provided cams controlling circuit-breaking contacts 21 and 22, the function of which will be explained in the course of the description of the circuit diagrams of the machine. The motor 23 (FIGURES 3 and 8) is an electric motor which drives the mechanisms, the control cams and the cam-operated contacts of the machine. The machine also comprises auxiliary devices such as card lever contacts, push rod contacts, relays, single-turn clutches, circuit breakers, etc., which are well known and currently employed in the record card machine art. These devices, of which a detailed description is not necessary for an understanding of the invention, will nevertheless be mentioned with reference to the functions which they perform in the machine, in the course of the description of the circuit diagrams. The card supply magazine 6 (FIGURES 1, 2, 3, 4, 5 and 10B) is provided with a partition 26 which is displaceable and may be secured in one of the locations 26A, 26B or 26C (FIGURE 10B) depending upon the size of the cards (A, B or C, FIGURE 11) which are processed in the machine. These various card sizes are provided respectively, for example, for 80, 51 and 38 record columns. Cards for 34 and 24 columns may also be employed. The mechanism for the extraction of the cards from the magazine 6 comprises an extraction knife 27 (FIGURE 10B) of known form. The knife may be secured by means of a screw 28 in one of the locations 28A, 28B or 28C in a sliding plate 29 depending upon whether the cards processed in the machine are to be of the size A, B or C (FIGURE 11). The sliding plate 29 is mechanically coupled (FIGURES 5 and 10B) to a rocking lever 30 adapted to rock about a pin 33 under the combined action of a cam 31 and of a counter-cam 32, which are both fast with a toothed wheel 48 turning about a pin 47. The sliding plate 29 is provided on the one hand with two lugs 36 and 37 which are apertured to slide (FIGURES 4 and 5) on a fixed guide bar 38, and on the other hand with a small guide plate 39 arranged to be able to move between two fixed bearings disposed on either side of the said small plate, the bearing 40 alone being shown in FIGURES 4 and 5. The coupling between the plate 29 and the rocking lever 30 is effected by means of an articulated connecting rod 44 and an attachment by means of a screw and nut 45 arranged to effect an accurate adjustment of the extreme positions of the movement of the knife 27 in the supply mechanism. The teeth of the wheel 48, which is fast with the cams 31 and 32, are coupled (FIGURE 8) to a toothed wheel 46 which may be driven by a transmission 50 through a driving mechanism 49 comprising (FIGURES 5 and 8) a single-turn clutch mechanism controlled by an electromagnet C51. This clutch mechanism may be of known type. The transmission 50 transmits to the mechanism 49 the movement which it receives (FIGURE 8) from the motor 23 through a transmission 42, a reduction gearing 57, a transmission 43 and a toothed wheel R12 meshing with a toothed wheel R13, which may transmit its movement to a wheel R14 through a (single-turn) clutch controlled by an electromagnet C58 for effecting the ejection of the cards (FIGURES 3 and 8). The wheel R14 transmits its movement to a toothed wheel 174 which is keyed upon the wheel R15 of the transmission 50. Most of these transmission parts are contained in the base 60 of the mechanism (FIGURES 2, 3 and 4) and are shown only in the diagrammatic drawing of FIGURE 8. The wheel 48 meshing (FIGURE 8) with the wheel 46 is fast with the cams 31 and 32 (FIGURE 5) and is keyed upon a wheel 52 which turns about the shaft 47. The wheel 52 meshes (FIGURES 5 and 8) with a wheel 53 which is in turn in engagement with a wheel 54. The wheels 53 and 54 are fast respectively with rollers 55 and 56 which co-operate for driving the cards which are extracted from the magazine 6 by knife mechanism. The transmissions 42, 43, 50 and 143 (FIGURE 8) consist of silent toothed-belt transmissions. These are flexible belts provided on their inside face with projecting bars disposed transversely at regular spacings and adapted to become lodged between the teeth in the wheels, which are connected together by the said belts without slip. The base 60, which supports all the mechanisms and contains the transmissions, is provided at its two ends with trunnions 61, of which only one is shown in FIGURE 4. Each trunnion rests in a recess 62 in the frame of the supporting cabinet 1. The trunnions 61 are arranged to permit rocking of the whole mechanism and to afford ready access to various parts and circuits of the machine. These trunnions also enable all the mechanisms to be locked in an inclined position, which has been accurately determined as being the most advantageous position for the servicing of the machine.

Figure 5:
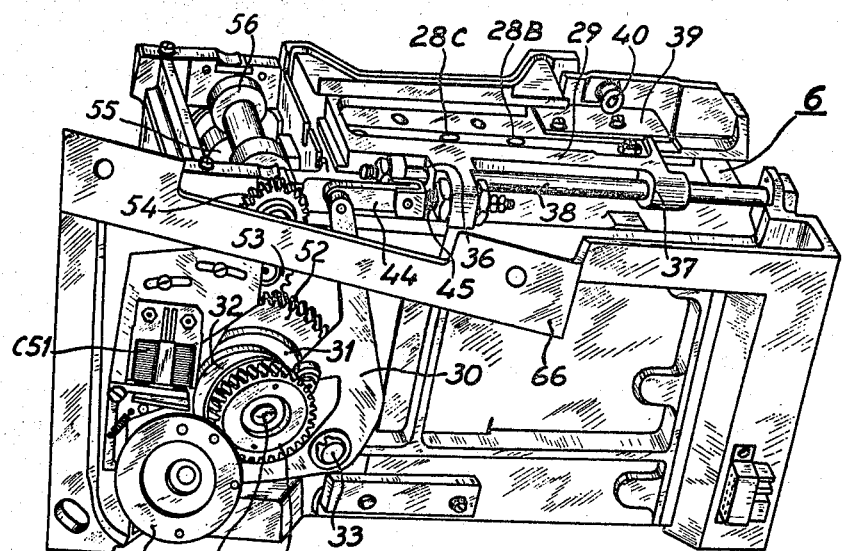
FIGURE 5 is a view of a detail of the mechanism for the extraction of the cards from the supply magazine.
Figure 6A:
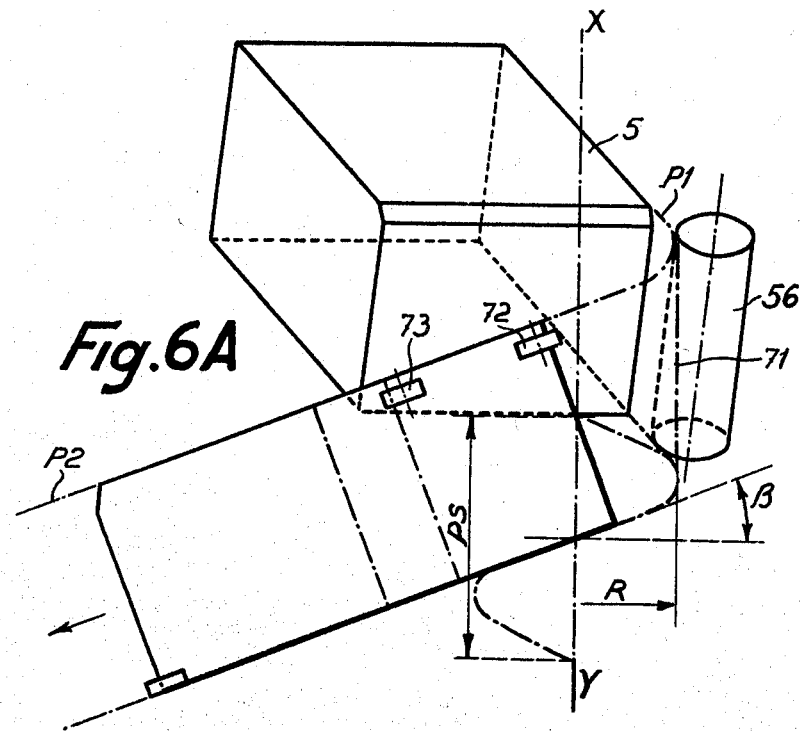
FIGURE 6A is a geometrical drawing diagrammatically illustrating the form of the path followed by the cards in the helical change of direction.
Figure 6B:
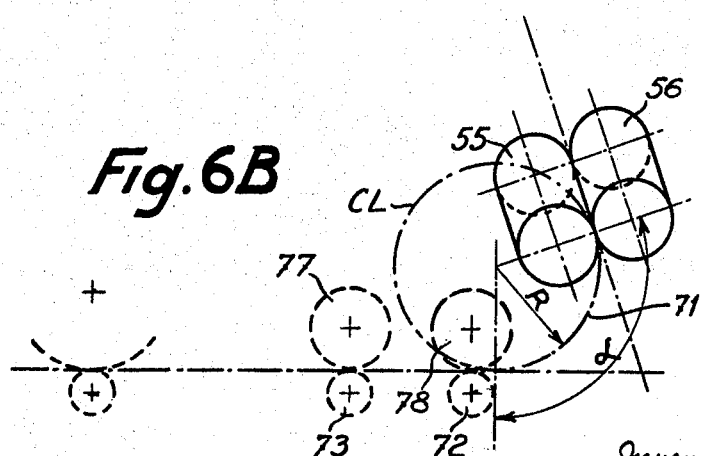
FIGURE 6B is a plan view partly corresponding to the drawing of FIGURE 6A.

The card supply magazine 6 forms part of a mechanical assembly which comprises a support unit 66, shown in an underneath view in FIGURE 5 in order that the arrangement of the mechanism for actuating the knife for the extraction of the cards from the said store may be more particularly illustrated. A card leaving the magazine under the action of the knife 27 (FIGURE 10B) first passes through a throat passage 70 and is then engaged between the rollers 55 and 56 (FIGURES 4, 5 and 10B), which push the said card into the helical passage 71 shown in developed form in FIGURE 10B, but the true shape of which is geometrically represented by the drawings of FIGURES 6A and 6B. In the example illustrated in FIGURE 6A, each card which is extracted from the stack of cards 5 in the magazine is advanced along the track represented by a strip P1–P2, which is curved so as to adapt itself partly to the surface of a cylinder CL (FIGURE 6B) of radius R and of which the axis is the line X—Y (FIGURE 6A). The strip P1–P2 representing the track is wound around the cylinder CL in the form of a helix of pitch PS with an angle of inclination $\beta$ and curved with an angle $\alpha$ in the neighborhood of 90° (FIGURE 6B). FIGURE 7 shows in fragmentary form a construction of a passage for the helical change of direction formed by the addition of two shells 71A and 71B which may be formed either of metal (appropriate cast alloy) or of plastic material (for example a thermosetting material, such as Araldite loaded with clay). The outer shell 71A for the helical direction change is detachable. For processing small cards (short cards, for example card C of FIGURE 11), intermediate driving rollers may be provided in one or more appropriate positions along the helical part of the direction change. On leaving the helical passage, each card is taken up (FIGURES 2, 6A, 6B, 8 and 10B) by presser rollers 72 and 73 which co-operate with driving rollers 77 and 78 in order to bring the said card into the waiting position 7 (FIGURES 1, 2 and 10B) before it reaches the punching station, a portion of the card remaining engaged, in the case of long cards, in the direction change. After the direction change and before the rollers 72, 73 (FIGURES 2, 4 and 7) are reached, the track is formed with an aperture 76 designed to permit the manual introduction of a card into the pre-punching position under conditions which will hereinafter be described. In FIGURES 10A and 10B (assembled), the track of the cards has been shown in rectilinear form to facilitate the explanations which will be given with reference to the diagram accompanying the said figures. In FIGURE 10B, and referring to FIGURE 8, the direction change 71 is comprised between the rollers 55–56 and the roller 78 with its presser roller 72. The punching station 8 comprises (FIGURE 10A) the punching device proper 81, a registering mechanism 80 for the positioning of the cards in the column 1 in the punching station and an escape device 82 for controlling the simultaneous advance of the cards engaged in the punching station 8 and of the cards engaged in the reading position 10. A card already advanced into the waiting position 7 is introduced into the punching station 8 under the action of the roller 77 and its presser roller 73, from which it is fed into an advance position, and thereafter moved to the rear by a registering lever 83 (FIGURE 10A) against a fixed registering abutment 84 (FIGURE 10B). The registering lever 83 is thereafter retracted. The operation of the device for registering the cards in precise positions will hereinafter be described in greater detail with reference to the diagrammatic drawings of FIGURES 12 and 13.

A punching mechanism of the punching device 81 provided in the punching station 8 is diagrammatically illustrated in FIGURES 10A–10B, which show in section the main parts for the control and actuation of a punch. The punching device 81 comprises a row of like mechanisms, each of which controls one punch and which are arranged to punch data in the various recording locations of the columns in cards which will be successively stopped in the punching position. The punches of the mechanisms of the punching device may be selectively actuated by a cam 95P which is keyed upon a shaft 20, on which there are also mounted the cams actuating the circuit breakers 21 and 22 (FIGURE 3).

The punching station also comprises the escape or step-by-step feed device 82 which is partially illustrated in FIGURES 10A–10B in relation to the punching device and is illustrated in greater detail in FIGURES 9A and 9B. This device, which controls the step-by-step feed advance and the jumping for the tabulation of the cards in the reading and punching stations, is arranged in the machine adjacent the punching device and disposed in alignment with the row of punches. It comprises, in part, members which are similar to those of a punching mechanism and comprises, more particularly, a detent mechanism (FIGURE 9B) in which the detent 85E resting on the lever 89E can occupy, as in a punching mechanism, an "engaged" position or a "disengaged" position below the depression bar 118, under the control of the electromagnet 86E acting on the lever 79E. The detent mechanism of the escape is supported by a plate PSE similar to the support plates PSP in the punching mechanisms. The escape device also comprises (FIGURE 9A) a driving disc 90 disposed in alignment with the punches and a presser roller 91 which can be moved towards or away from the disc 90 by a control mechanism which will hereinafter be described. The disc 90 is fast with a ratchet wheel 92 and a gear-wheel 115, which are both keyed on the same shaft (FIGURE 8). All these wheels are constantly urged to turn in the direction of the arrow FE, so as to drive the cards under the action of the motor 23 of the machine, through a mechanical transmission chain formed as indicated in FIGURE 8. The motor 23 drives the reduction gearing 57 through the transmission system 42, and, through the transmission 43, it drives the wheel R12 meshing with the wheel R16. The latter is coupled to a wheel R17 through a coupling mechanism 93 which comprises a mechanical magnetic or other friction device. The wheel R17 is in engagement with the wheel 59 which is keyed on a shaft 108 fast with the guiding disc 110 for the reading station 10. The wheel 59 is coupled through a wheel 111 to a wheel 113 which is keyed on a shaft 114, and the wheel 113 is coupled through a wheel 112 to the wheel 115 of the escape mechanism. A programming drum 14 is mounted on the shaft 108, while another programming drum 15 is mounted on the shaft 114 (FIGURES 2 and 3). The escape pawl 94 is pivotally connected to a fixed member 109 and normally urged into the position of engagement with a tooth of the ratchet wheel 92 under the action of a spring 107 so as to block and prevent the movement of the said ratchet wheel under the action of the motor 23 (FIGURE 8). The pawl 94 may be temporarily disengaged from the ratchet wheel 92 under the action of a system of cams and levers (FIGURE 9A), which is under the control of an electromagnet 86E (FIGURE 9B), or maintained disengaged by the energisation of an electromagnet 100 acting (FIGURE 9A) on a movable armature 101 which is fast with the said pawl 94. The mechanisms for the feed advance of the cards in the processing stations are designed to make it possible to deal with cards having 80 columns or less and the interval between the last column of an 80-column of cards and the first column of the card which follows it in the track, in the card processing zone, has been so chosen as to be equivalent to a space of 8 card columns. The length of the circumference of the discs 90 and 110 of the processing stations then corresponds to a space of 88 columns of a card. Consequently, the ratchet wheel 92 which is keyed on the disc 90 of the punching station is provided with teeth spaced apart by $1/88$ of a turn, but the eight tooth positions corresponding to the space between two successive cards are not recessed, so as to prevent engagement of the pawl and to facilitate the continuous jumping from the last column of an 80-column card to the first column of the succeeding card. The advance by one step or one card column is systematically brought about, after each punching operation by the electromagnet 86E of the escape device, which is automatically energised, each time an electromagnet 86P of the punching device is energised, as is shown in FIGURE 18A. The electromagnet 86E which is mounted on the support plate PSE of the escape mechanism (FIGURE 9B) acts, when energised, on the lever 79E which controls the engagement of the detent 85E under the bar 118. This detent rests on a lever 89E which co-operates with a lever 104 of the control mechanism of the cam escape system. When the electromagnet 86E is energised, the detent 85E is disengaged by the lever 79E and, as in a punching mechanism, is positioned below the depression bar 118 (FIGURE 9B). When the said bar 118 is lowered by the cam 95P (FIGURE 10B) in order to perform a punching operation, the lever 89E which controls the escape mechanism is lowered by the engaged detent 85E and lowers the lever 104 which is fast with a member 124 adapted to pivot about a fixed pin 147. The lever 104 is maintained in permanent contact with the lever 89E by the action of a spring 148. Mounted on the same pin 147 as the lever 104 is a lever 105 which is pulled by a spring 149 and retained by a dog 146 fast with the member 124. The lever 105 is provided, at its end, with a recess 142 in which there is adapted to engage an abutment 99 fast with the lever 97 which is arranged to pivot about a pin 75 fast with a lever 98, which is arranged to pivot about a fixed pin 74. The lever 98 is provided with a roller 69 which is maintained in contact with the cam 95E under the action of a spring 191. The lever 97 pivoting about the pin 75 is provided with a roller 103 which is urged towards the cam 95E by a spring 192. The said lever 97 is also provided with a hook 96 which is positioned under a blade 106 fast with the pawl 94 when, under the action of the lever 89E lowered by the bar 118, the lever 104 is lowered and rocks the lever 105 which disengages the abutment 99. Since the hook 96 is brought under the blade 106 owing to the energisation of the electromagnet 86E, the action of a boss on the cam 95E passing under the roller 69 displaces the pin 75 in the direction of the arrow FD, and the hook 96 lifts the blade 106 and disengages the pawl 94 from the ratchet wheel. The wheels 59 to 115 (FIGURE 8) can then turn under the action of the motor 23 by way of the coupler 93. The guiding discs 110 and 90 can then turn and drive the cards in the working stations, as also the shafts 108 and 114 on which the programming drums are mounted, but the boss of the cam 95E then passes under the roller 103 of the lever 97, which then rocks about its pin 75. The hook 96 is thus withdrawn from below the blade 106 and the pawl 94 falls back into the succeeding recess in the ratchet wheel under the action of the spring 107, unless the electromagnet 100, which can maintain the pawl in the disengaged position, is energised. The absence of recesses in the ratchet wheel 92 controlling the spacing between the cards has the effect that, if the pawl is released in this space, the ratchet wheel will continue to turn as far as the recess corresponding to the stoppage on the first column of the succeeding card. Each time the pawl 94 is disengaged from the ratchet wheel 92, a rod 178 fast with the pawl and acting on a blade 176 opens a contact 207, the function of which will be explained in the course of the description of the electric circuit diagram of FIGURE 23. During the advance of a card in the punching station 8 under the combined action of the disc 90 and of the presser roller 91 of the escape mechanism, the said card is progressively carried towards the reading position 10, through the intermediate position 9. The card is thus advanced between the roller 120 and the presser roller 121 (FIGURE 10A). The roller 121 is also shown in FIGURES 1 and 2. While the card is being advanced by the disc 90 and the roller 91, the roller 121 is moved away from the roller 120 and the roller 73 away from the roller 77 by a device which will hereinafter be described. When a card has ceased to pass over the roller 91, the latter is moved away from the disc 90, while the roller 121 is moved towards the roller 120 so as to position the card in the reading station 10. As in the punching device, the card is advanced by the roller 120, the roller 121 is thereafter removed and the card is moved backwards by the registering lever 125 against a fixed reference abutment 126 against which it is maintained by a retaining spring 102. During these movements of the card, the brushes BR are lifted by a cam and the first column of the card is thus brought under the row of brushes. The roller 127 is then moved towards the disc 110, the roller 91 is moved towards the disc 90, the brushes BR are lowered and the rollers 121 and 73 are moved away from the rollers 120 and 77. For the processing of cards of small sizes, auxiliary driving rollers and additional reference abutments will be appropriately disposed.

As has been mentioned in the foregoing, the cards are positioned in the reading and punching positions by means of registering levers 125 and 83, which bring the cards against the reference abutments 126 and 84 (FIGURES 10A–10B). For this purpose, each registering lever is fast with a lever 129 controlled by a registering bar 130 (FIGURES 12 and 13). The bar 130 (FIGURE 12) is arranged to be able to slide longitudinally on screws 131 which are fast with the frame and are engaged in slots 132. One end of the bar 130 is fast with a lever 133 pivotally mounted on a pin 134 and provided with a plate 135 on which there bears the roller 136 of a lever 137, which is adapted to rock about a pin 138 under the action of a cam 139 pushing a roller 140, which is also fast with the lever 137. A return spring 141 acting on the registering bar 130 returns the said mechanism. The bar 130 is provided with the two bosses 144, of which only the boss controlling the registering lever 125 (FIGURES 10A and 13) is shown (FIGURE 12). In the course of each revolution of the shaft 163 (FIGURES 8 and 12), the cam 139 performs one revolution and transmits to the registering bar a translational movement which shifts the bosses 144 from one position 144A (FIGURE 13) to a position 144B, and then returns them to the position 144A. Under the action of a spring 145, each lever 129 connected to a registering lever 125 or 83 by a pin 128 accompanies the corresponding boss in its movement and carries with it the registering lever to which it is connected. In this movement, the registering lever encounters the forward edge of a card CT and brings the rear edge of this card into contact with a fixed reference abutment, as has been stated in the foregoing. At this instant, the registering lever is stopped (by the card) in the position 125B and the boss 144 continues its movement merely as far as 144B, the spring 145 being so designed as not to deform the cards. The registering bar 130 is then brought by the cam 139 to the position illustrated in FIGURE 12 and the registering lever 125 is brought to the position 125A (FIGURE 13).

The presser rollers 127 and 91, which co-operate with the discs 110 and 90 respectively for the precise positioning of the cards in the reading and punching positions of the machine, will for this reason be called precise station rollers and are controlled by a device diagrammatically illustrated in FIGURE 14. This device also effects the lifting of the brushes (FIGURE 15) during the positioning of a card in the reading station. A similar device (FIGURE 16) controls the rollers 121 and 73 (FIGURES 10A–10B) which co-operate with the rollers 120 and 77 respectively and are called inter-station rollers by reason of their situation in the intermediate positions of the track (IP, FIGURES 10A–10B).

FIGURE 14 shows a part of the control mechanism of the precise station rollers and diagrammatically illustrates that part of the mechanism which is concerned with the control of the roller 127 which co-operates with the disc 110 for the positioning and driving of the cards in the reading station 10. The control bar 150 (FIGURE 14) is provided with guide and return means (not shown) similar to the devices shown in FIGURE 12 for the control bar 130 of the registering levers 125 and 83. The presser roller 127 is mounted (FIGURE 14) on a lever 151 which is adapted to pivot about a pin 152. This lever is pushed by a spring 155 against a shoe 153 fast with the control bar 150. The latter is fast with a lever 154 adapted to rock about a fixed pin 156, the other end of the said lever being provided with a plate 157 against which there bears a roller 158 fast with a lever 159 pivotally mounted on a fixed pin 160. The said lever is provided with another roller 161 which bears against the profile of a cam 162 keyed on the shaft 163, of which the rotation is controlled simultaneously with the card ejection mechanism (FIGURE 10A). The lever 151 is provided with an inclined surface 164 against which there bears the shoe 153 fast with the bar 150 and so arranged that the lever 151 is lowered or lifted, depending upon the movements imparted to the bar 150 under the action of the cam 162, in order to ensure that the precise station rollers 127 and 91 are moved apart under the conditions hereinbefore specified. At the same time as the cards are positioned in the precise stations (P.P.), the reading brushes BR (FIGURE 10A) are lifted to permit the positioning of the cards. For this purpose, a sliding plate 165 (FIGURE 15) for lifting the brushes is provided with a comb for centering and separating the twelve brushes BR, which are so arranged that they each scan the position of a row of perforations in a card. The sliding plate 165 is provided with a fork 166 in which there is engaged a dog 167, which is in turn engaged in a recess 168 in the control bar 150 of the precise station rollers. This dog is connected to a lever 169 rockably mounted on a pin 170. The other end 171 of the lever is mechanically coupled to a means for controlling the lifting of the brushes in the prorgamming device which will hereinafter be described. FIGURE 15 shows the bar 150 in its extreme right-hand position, in which the brushes BR are in their normal reading position. The bar 150 has been shown in its extreme left-hand position in dash-dotted lines in the same figure. In this position, a part 173 of the sliding plate 165 is advanced under the brushes and lifts them merely by bending the said brushes, without modifying the position in which they are secured, in order to break the contact of the said brushes with the reproducing plate PR (FIGURES 15 and 10A).

The object of the mechanism for the control of the inter-station rollers is to move the rollers 121 and 73 away from the rollers 120 and 77 during the processing of the cards. This mechanism is partially diagrammatically illustrated in FIGURE 16, which shows the main parts of the mechanism for controlling the presser roller 121 of the driving roller 120 (FIGURE 10A). The general arrangement of this mechanism has some similarity to the mechanism for the control of the precise station rollers (FIGURE 14) and utilises common members. It comprises a control bar 180 coupled by a pin 184 to a lever 181 rocking about a fixed pin 156 and actuated through a rocking lever 183 mounted on a pin 160, the said rocking lever being actuated by a cam 182 turning with the shaft 163. The cam 182 is fast with the same shaft 163 as the cam 162, which (FIGURE 14) controls the movements of the precise station presser rollers. The bar 180 and the lever 181, which is connected to the said bar by a pivot point 184, are subjected to the action of a return spring 179. The bar 180 is formed with guide slots 178 and inclined surfaces 187, 187A (FIGURE 16), on which there bear rollers 188, 188A fast with a bar 185 supporting the inter-station presser rollers 121 and 73, the said bar 185 being adapted to slide vertically between guides 186. Springs 189 urge the rollers 188, 188A against the inclined surfaces 187 and 187A. Under these conditions, when the cam 182 rises, i.e. when this cam pushes the rocking lever 183, the bar 180 is moved to the left and the inclined surfaces 187 acting on the rollers 188 lower the bar 185, to which the interstation rollers 121 and 73 (FIGURES 10A–10B) are connected. When the cam 182 descends, the bar 180 is shifted in the other direction and the inter-station rollers are lifted against the driving rollers. The bar 180 has in suitable positions recesses designed to receive rollers co-operating with larger rollers to permit the advance of cards of small dimensions in the intermediate stations.

The reading station 10 (FIGURE 1, 2 and 10A) is provided with a row of brushes BR for exploring the perforations in the various columns of the cards which are advanced in the said reading station. Depending upon the arrangement of the machine, this exploration may be utilised in various ways. In the first place, there will be considered the automatic data reproducing function, which is one of the main functions of the machine. In this case, the punched data scanned in various columns of a card advanced through the reading station are automatically reproduced in known manner in the corresponding columns of a card passing through the punching station 8 and under the control of the programme. This scanning may also be utilised in the machine operating as a checking machine, by comparison of the data scanned in the columns with data manually introduced by means of the keyboard.

The reading station is, of course, provided with a device (not shown) known as a card lever, which is arranged to close an electric contact as soon as a card is introduced into the reading position.

The presser rollers of the devices assisting in the feeding of the cards along the track are arranged with a slight inclination in relation to the direction of the feed advance of the cards, so as to push them constantly towards the upper edge of the track, against which they are permanently aligned.

On leaving the reading station 10, the cards are advanced in the receiving compartment 11 (FIGURES 1, 2 and 10A) in order to be stacked therein. This compartment is provided with means for rapidly adapting it to receive cards of any sizes which may be dealt with in the machine.

The cards coming from the reading station are advanced into a location PA (FIGURE 10A) above two screws or helical blades 193 and 194, which are driven by the shaft 163 controlled by a single-turn clutch C58 (FIGURE 8).

The card may be manually extracted for visual inspection and then again deposited in this location. When another card is advanced towards the receiving compartment, the screws are again driven through one revolution. The movement of the shaft 163 is transmitted (FIGURE 10A) to the screw 194 by a worm mechanism 175. The card already engaged is then pushed into a stack of cards PE against a plate 195 (FIGURES 1, 2 and 10A), which is urged by a gripping spring 196 (FIGURES 3 and 10A). The stacking device is arranged to receive about 500 cards. The cards advanced in the receiving compartment are stopped in a position which is determined by a registering bar 197 (FIGURES 1, 2 and 10A) fixed in a location depending upon the size of the cards being processed. The cards stacked against the plate 195 rest on rods 198, 199 and 200 (FIGURE 10A).

As already mentioned with reference to other mechanisms of the machine, the shaft 163 driving the card stacking mechanism is driven by the motor 23 through the single-turn clutch C58 (FIGURES 3 and 8). This shaft also supports the cam 139 (FIGURE 12) controlling the card registering levers (FIGURES 12 and 13) in the reading and punching stations, as also the cam 162 (FIGURE 14) employed to control the presser rollers of the precise stations and to lift the brushes (FIGURE 15) of the reading station, and the cam 182 (FIGURE 16) controlling the inter-station presser rollers. The shaft 163 also supports (FIGURE 3) cams 172 of cam-operated contacts 177 for controlling electric circuits.

As mentioned in the foregoing, the following operations may be controlled by a programming device:

Automatic positioning of the cards in the reading and punching stations.

Automatic reproduction of data in predetermined columns.

Automatic skipping of certain columns or stopping of a card on a predetermined column in the punching station for recording a datum in the said column under the control of the keyboard.

This device may comprise one or more drums 14 and 15 (FIGURES 1, 2 and 3) on which cards 67 and 68 having coded combinations of perforations are detachably secured.

The control keyboard 3 which is illustrated in FIGURES 1, 2 and 3 is a control keyboard for recording numerical data, but the machine may equally well be employed with an encoding keyboard for controlling the recording of alphanumerical data, of the same type as the keyboard described in a patent application filed in the United States on June 28, 1963, Serial Number 291,313. The machine according to the present invention is described here with reference to a merely numerical control keyboard, but the adaptation of an alphanumerical keyboard such as that mentioned in the foregoing to the said machine presents no technical difficulty to a person skilled in the record-card machine art.

In the foregoing, it has been seen that the cards processed in the machine are subjected therein to the action of two sets of control devices which act alternately on the said cards. A first set comprises the devices which produce the movements and positioning of the cards in the course of their processing in the punching and reading stations (precise stations). In the said stations, the positioning of the cards and their feed advance are controlled on the one hand by the escape mechanism (FIGURE 9) actuated by the motor of the machine through a friction coupling mechanism (or the like), and on the other hand by the mechanism controlling the presser rollers in the precise stations. A second set of control devices comprises the auxiliary stations consisting of the supply magazine with the devices for extracting and driving the cards, the inter-station mechanisms of the track, and the devices by which the cards are ejected into the receiving compartment. The mechanisms of these auxiliary stations are actuated by the motor of the machine through a cyclically operating single-turn clutch mechanism. The advance of the cards in the intermediate stations and until the time of their ejection is also controlled by the mechanism controlling the presser rollers in the intermediate stations. The coordination of the operation of the control sets is so effected that the end of a card processing cycle automatically brings about the commencement of a card supply cycle, in the course of which a card is extracted from the magazine and advanced into a waiting position, while the card previously extracted is positioned in column 1 in the punching station at the same time as a card leaving the said punching station is advanced and positioned with its column 1 in the reading position. The card leaving the reading position is simultaneously advanced into the card ejection compartment. When these cards are in position on the column 1 in the precise stations, the reading and punching operations are allowed to proceed. The inter-dependence between the control sets is partly automatically brought about under the control of electric circuits comprising relays, cam-operated contacts, safety contacts, such as contacts detecting full and empty card compartments, contact levers which check the presence or absence of cards in a particular location along the track, and other elemental devices whose use is well known in the record-card machine art and the operation of which will hereinafter be described. This coordination is also partly brought about by the programming device, the main component parts of which have been described.

The electric circuits of the machine may be considered in four distinct parts, the functions of which overlap to a varying extent in the course of the operation of the machine. In a first part, the general circuits govern more particularly the starting of the machine and the control circuits for starting of the supply, the manual insertion and the ejection of the cards. In a second part, the circuits concerning the circuits concerning the punching of data are considered. In a third part, the circuits concerning the positioning, tabulation and ejection of the cards and theh programming are considered. In a fourth part, the circuits concerning the controlled reproduction are considered.

The general circuits comprise (FIGURE 17A) cam-operated contacts CA1 and CA2 which are present in the set of contacts 177 (FIGURE 3) and are closed at predetermined instants, indicated in the diagrams of FIGURE 17B by cams which are present in the set of cams 172 and which are mounted on the shaft 163 (FIGURES 3 and 8). Two other cam-operated contacts CT1 and CT2 are closed at instants indicated in FIGURE 17B by cams fast with the shaft 114 (FIGURE 8), on which the programming drum 15 is mounted (FIGURES 2 and 3). A full-compartment contact CCP on the ejection compartment (FIGURE 10A) is opened by a stud TQ when the quantity of cards in the said compartment reaches a limited number. A card lever contact LCP (FIGURE 17A) arranged in known manner is adapted to be closed by the presence of a card in the punching station and it is validated when the cam-operated contact CA2 closes and the card is thus registered in the station. Another card lever contact LCL (FIGURE 17A is disposed in the reading station so as to be closed by a card present in the said station and it validates the reproducing operations. A push-button switch CPAM (FIGURES 1 and 17A) permits the insertion of a card in a processing station of the machine. A switch PIM1 controlled by a push button PIM (FIGURES 1 and 17A) is coupled to the mechanism of the spacing bar of the presser rollers in the precise stations (FIGURE 14) and permits the manual insertion of a card into a processing station. A single-turn clutch C58 (FIGURES 3, 8 and 17A) controls on the one hand the driving of the card ejection mechanism and on the other hand the supply of cards when the electromagnet C51 which controls (FIGURES 5, 8 and 17A) the clutch of the card supply mechanism is energised.

In order to bring a card from the card magazine to the punching station, it is necessary, as will be shown with reference to FIGURE 10B, to depress the ejection button PEJ (FIGURE 19), which is on the keyboard, three times.

The arrival of a card in the punching station 8 closes the contact of the card lever LCP (FIGURE 17A). The contact LCP and the contact CA2 being closed, a card is registered with its first column under the punching station. The relay 347, the function of which will hereinafter be explained (FIGURE 17A) is energised. As long as a card is present under the contact LCP (which is hence closed), the relay 353 is energised and opens its contact 453, which prevents energisation of the electromagnet C51 of the card supply clutch (FIGURE 5).

The card lever contact LCL is closed by the arrival of a card in the reading station and energises the relay 316 (FIGURE 17A), which closes the contact 416 (FIGURE 18A), the function of which will be hereinafter explained with reference to the punching. The operation of the device for the manual insertion of cards into the track is as follows: In order to insert a card manually, for example during operation for introducing data which will subsequently be automatically transferred from card to card, it is first necessary to empty the location which is to receive the card. The cases may arise:

Either a card may be engaged in the punching station in which case it is introduced through the aperture 76 (FIGURES 2, 4 and 7) situated immediately after the change of direction of the cards as they leave the supply magazine, or A card may be engaged in the reading station.

For the insertion of a card in the punching station, the following manipulations must be performed:

(a) Depression of the switch CPAM (FIGURES 1 and 17A) brings it from the position ALIM to the position $\overline{\text{ALIM}}$ and prevents any automatic supply of a card by energisation of the electromagnet C51 of the clutch of the supply mechanism (FIGURE 5), (b) Depression of the ejection control push button PEJ (FIGURE 19) which is on the keyboard, frees the punching station from any cards and brings the programming drums on to the column 1. The manual insertion must always take place on the column 1, because the card is always positioned on the column 1 after registration, (c) Depression of the push button of the switch PIM (FIGURES 1 and 14) for removing the presser rollers from the processing stations. The switch PIM1 (FIGURE 17A) passes from $\overline{\text{IM}}$ to IM and the relays 354 and 364 are thus energised and maintained in this condition as long as CA1 is closed. The energisation of 364 opens 464 (FIGURE 18A) and prevents any punching while the presser rollers are open. A card may then be introduced through 76 (FIGURES 2, 4 and 7) into the punching station, (d) A second depression on the push button of the switch PIM bring the presser rollers into the pressing position and the contact PIM1 in its off position $\overline{\text{IM}}$ energises the relays 350, which reverses the contact 450 and through CA1 (closed), energises the electromagnet C58 of the ejection clutch (FIGURE 8) which controls the registration of the cards.

It will be noted that the push button PIM which controls the manual insertion (FIGURE 1) is mechanically coupled to a switch PIM2 (FIGURE 19) and to the push button PIMEC (mechanical) (FIGURE 14).

With regard to the insertion of a card into the reading station, a number of cases are possible:

(a) It is desired to introduce a card into the reading station and a card into the punching station.

The above-indicated procedure will be followed. For introducing a card into the punching station, the ejection push button PEJ (FIGURE 19) will be operated twice in succession in order to free the punching station and to free the reading station.

(b) It is desired to introduce a card manually into the reading station and to introduce a card automatically into the punching station.

In this case, the same procedure as before will be adopted, but before the push-button switch PIM is depressed a second time, the push button of the switch CPAM (FIGURES 1 and 17A) will be depressed, whereby the switch will be brought from the position $\overline{\text{ALIM}}$ to the position ALIM in order to validate the automatic supply of a card, which will take place simultaneously with the registering cycle.

(c) It is desired to introduce a card into the reading station without changing the card which is in the punching station.

The card in the punching station being positioned in column 1, the push button of the switch CPAM is actuated in order to return the said switch to the position $\overline{\text{ALIM}}$ and a pressure exerted on PIM opens the presser rollers by action on PIMEC (FIGURE 14). A single depression of the ejection push button PEJ of the keyboard (circuit diagram of FIGURE 19) releases the reading station without releasing the punching station, since the presser rollers are open. A card may then be manually introduced into the reading station by passing it under the row of punches. A second pressure exerted on the push button PIM brings the switch PIM1 into the position $\overline{\text{IM}}$, recloses the presser rollers and initiates the registration.

In continuous operation on a series of cards, the contact CT2 is closed at the passage of the column 80 of the cards into the processing stations and the closing of this contact energises the relay 351 (FIGURE 17A), which closes its contact 451 (FIGURE 19) and performs the same function as a manual depression of the ejection key PEJ, with which the contact is in parallel (FIGURE 19).

The eletcric circuits controlling the punching of data in cards under the control of the keyboard comprise (FIGURE 18A) the punching control contacts CB9 to CB12 which correspond to the keys numbered 9 to 12 in the order of the standard numbering of numerical keyboards of record-card punching machines, i.e. the numbers 9, 8, 7, 6, 5, 4, 3, 2, 1, 0, 11 and 12 of the keys of the keyboard each correspond to one recording position in a record-card column. The contact CESP (FIGURE 18A) corresponds, on the keyboard, to the spacing control key, which is a control key for controlling the skipping of a column by energising the electromagnet 86E which controls the detent in the escape mechanism (FIGURE 9B). Operation of a recording key of the keyboard reverses the contact CU, opens the contact CUR and closes the contact CUT. The keyboard also comprises an erasing key TEF (FIGURE 18A), the function of which will hereinafter be explained, and a punching control key coupled to two contacts 1PER and 2PER (FIGURE 18A). The circuit-breaking contacts CR1, CH2, CR3 and CR4 are controlled by cams mounted on the shaft 20 (FIGURES 3 and 8) which (FIGURES 10A–10B) supports the mechanical cams of the punching mechanism and of the escape mechanism. The instants at which each of these contacts is closed are indicated in the diagram of FIGURE 18B for one revolution of the shaft 20. A "programme" push button is mechanically coupled to a switch PPR1 (FIGURE 18A) and to a switch PPR2 (FIGURE 19) to permit or prevent the intervention of the programming device. A push button PES (FIGURE 18A) is provided for cancelling the spacing in order to permit, for example, the recording of combinations of perforations in cards which will be used as programming cards. The electro-magnets 86P9 . . . 86P0, 86P11 and 86P12 of the punching mechanisms release the detents and correspond to the location of the electromagnet 86P, without special designation, represented in a punching mechanism (FIGURE 10A). The normally closed contacts CBR of the contacts CB of the keyboard control keys are directly connected (FIGURE 18A) to the contact brushes BR9 . . . BR12 of the reading station, one of the said brushes being mounted at BR without special designation (FIGURES 10A and 15). The brushes BR are arranged to make contact with the reproduction plate PR (FIGURES 10A, 15 and 18A). Diodes DI are disposed at various points of the circuits to prevent return currents between the circuits.

When a card is positioned in the punching station, the manual control of the punching of a datum is effected by depression of a numerical key of the keyboard.

The punching devices operate cyclically, while the punching operations are manually controlled by means of the keyboard in a random fashion. The cam-operated circuit breakers CR1, CR2, CR3 and CR4, which operate cyclically, in conjunction with the operation of the punching device, have the object of establishing a connection between these two movements.

The depression of a numerical key or of the "space" key of the keyboard (contact CESP) produces the rocking of the contact CU and the closing of the contact CUT (FIGURE 18A), and, by way of the contact 414 in the "off" position, the energisation of the relays 303 and 311 of a so-called "controlled return selection of the keyboard" circuit. This circuit, which is indicated in FIGURE 18A by S.R.C., comprises the relays 303, 311 and 312, and the contacts controlled by the said relays. A circuit is established as follows: + pole of the current source, contact 413 in the "off" condition (relay 313—FIGURE 19 not being energised), contact 464 in the "off" position (the relay 364 of the "manual insertion device" DIM, FIGURE 17A, not being energised), contact CUT (of CU, FIGURE 18A) closed, contact 414 in the "off" position, relay 303 and in parallel the relay 311 through the contact 412. The energisation of the relay 311 closes the contact 411 and establishes a holding circuit through the contact of the erasing key TEF, the contact 403 closes, but the relay 312 cannot be energised through the diode D12. The electromagnet 215 of the keyboard is energised by 411 (closed) and 447, which is changed over by 347, which is energised by CT1, LCP, CA2 (FIGURE 17A), and through the contact 420 in the "off" position. The electromagnet 215 of the keyboard attracts a dent and rocks the contact CP of the depressed key, i.e. for example the contact CB9 of the key 9 of the keyboard, opens CBR and closes CBT. At the same time, the rocking of the armature of the electromagnet 215 closes the general contact 229 (FIGURE 18A), through which the relay 314 is energised and changes over the contact 414, which renders ineffective a prolonged depression of the control key (contact CUT closed). The relay 319 is also fed. At the instant of the closing of the circuit breaker CR1 (FIGURES 18A and 18B), a circuit is established as follows: + pole, CR1, contatct 410, contact 419 reversed, contact 406 in the "off" position and hence on the one hand contact 422, contact 405, contact 403, relay 312 which changes over 412, breaks 311, which releases 411 and opens the keyboard electromagnet 215. On the the other hand, CBT (closed) of CB9 energises the electromagnet 86P9 of the punching device and releases the detent which controls the actuation of the punch of the mechanism of the position 9. At the same time as 312, 303 is energised, but the opening of 411 ensures holding by CR1 as long as CR1 is closed. As long as 215 is energised, the control keys of the keyboard are held fast.

Since the control of the perforation by the keyboard is a random control, while the effective control of a punching mechanism takes place with cyclic operation, the overlap of the two controls must be such that the electromagnet 86P which is energised in order to release the detent of a punching mechanism is energised for a period of time which is at least sufficient to ensure that this function is performed. It is therefore necessary to ensure transmission of a pulse of complete duration to the said electromagnet. For this purpose, during each pulse transmitted by the circuit breaker CR1, the positive voltage of the supply is applied to the point X of the relay 319. If the general contact 229 of the keyboard (FIGURE 18A) is closed during the closing of the circuit breaker CR1, the voltage applied to the relay 319 is substantially blocked and the relay 319 can be energised only when this pulse has ended. With such a circuit for validating the succeeding pulse, the keyboard would still be blocked, since it would be released only at the end of the succeeding pulse supplied by CR1. This process might result in a reduction of the rate of use permitted for the keyboard. This disadvantage is obviated by transferring to the detent mechanism of the punching device the memorisation of the control of the keyboard without awaiting the succeeding pulse transmitted by CR1. To this end, a second cam-operated breaking contact CR2 is provided, the closing period of which is equal to the closing period of CR1, but the closing of which is delayed by a half of its duration. The difference in this case resides in that, if the actuation of the punching control key takes place early enough in relation to the closing of CR1 so as to permit the use of the pulse triggered by the latter, the punching will take place immediately afterwards, in the course of the same circuit breaker cycle (40 milliseconds), failing which it will be the pulse supplied by CR2 which will be validated for bringing about the punching in the succeeding cycle. The pulse CR1 of the succeeding cycle, which would produce a double control in the same punching cycle, must then be invalidated. In order to avoid this, if a pulse transmitted by CR2 explores the contacts of the keyboard, CR3 is closed at the same time, and energises the relays 309 and 310, which will then be held at CR4 by 409 and the opening of the contact 410 (by the energised relay 310) invalidates the closing of CR1.

The space, i.e. the passage from one card column to the succeeding column, is systematically controlled by energisation of the electromagnet 86E of the escape mechanism (FIGURES 9B and 18A) through the contact 442 in the "off" position. The escape operation will be mechanically delayed (FIGURES 9A and 9B) by the cam 95E controlling the escape, until after the punching operation. The escape may be initiated at will by means of a key of the keyboard controlling the contact CESP (FIGURE 18A). This key, like the numerical keys, acts on the contact CU energising the electromagnet 86E.

The reading station, which is situated after the punching station in the machine, analyses column-by-column the cards which are advanced under the set of reading brushes BR and permits of controlling the reproduction of the scanned data, by automatic punching, in the corresponding columns, of the succeeding card which enters the punching station. The reproducing operation may be initiated either as desired by the operator, who for this purpose depresses the "punching" control key, which is on the keyboard and which is coupled to the contacts 1PER and 2PER (FIGURE 18A), or by the programme by scanning of a code 7 on the programme card, when the automatic controls of the machine are governed by the programme. In all cases, the reproduction stops only automatically by scanning of a code 4 (end-of-zone indication), in the programme card.

In order manually to initiate the automatic reproduction, therefore, the "punching" key is depressed, whereby the contact 1PER is closed and the relay 346 is energised, and closes its contact 446. The contact of the card lever LCL (FIGURE 17A) being closed by the presence of a card in the reading station, the relay 316 is energised and the contact 416 (FIGURE 18A) is closed. The contact 418 being in the "off" position, the relay 345 is energised and closes its contact 445 which, through the normally closed contact CUR of CU, energises the relays 304, 305, 306, 307 and 308. The contact 404, which is closed by energisation of 304, energises the relays of the controlled return selection circuit SRC, of which the relay 311 closes the contact 411, by which the relays 304 to 308 are held. The electromagnet 215 of the keyboard is energised by 411 and closes the contact 229 by which the relays 319 and 318 are fed. The relay 318 changes over the contact 418, which renders ineffective the closing of 1PER in the event of prolonged depression of the "punching" key. The energisation of the relay 307 (maintained energised through the contact 404) opens the contact 407 and invalidates the pulses transmitted by the closing of the cam-operated circuit breaker CR2. The energisation of the relay 305 changes over the contact 405, through which transmission of a pulse controlling the release of SRC has been possible, and establishes another channel rendering possible this control from the programme. The energisation of the relay 306 changes over the contact 406 so as to direct the pulses emanating from CR1 to the reproduction plate PR of the reading station. The energisation of the relay 308 opens the contact 408 (FIGURE 19), which invalidates the "tabulation" control pulses TAB or "ejection" control pulses PEJ throughout the duration of the automatic reproduction. In order to control the initiation of the reproduction by the programme, a pulse coming from CRP1 (FIGURE 20) and of which the generation will be explained in the following, is applied to the terminal CRP2, which is connected to the normally closed contact 446 of the relay 346 (FIGURE 18A). The sequence of events is then the same as described in the foregoing as a result of the closing of the contact 1PER by a manual control of the "punching" control key of the keyboard.

Checking of the reproduction, which is optional, has the object of verifying the presence of an indication (punched hole) to be reproduced in each of the columns which are scanned, for the purpose of automatic reproduction under the control of the programme. In this case, the relay 336 (FIGURE 19) is energised by scanning of a perforation 9 in the same programme card column which comprises the perforation initiating the automatic reproduction. The relay 345 being energised (FIGURE 18A), the closing of 436 by energisation of 336 permits energisation of the relay 367, which closes the contact 467, by which the relays 342 (FIGURES 18A and 19) and 368 and 317 (FIGURE 18A) are energised. Energisation of the relay 368 closes the contact 468, which maintains this group of relays in the energised condition, in parallel with the group of relays 304 to 308. The relay 342 is also energised and changes over tthe contact 442, which deenergises the electromagnet 86E of the escape mechanism (FIGURE 9B) which was automatically energised during the closing of the contact CR1 (FIGURES 18A and 18B). The electromagnet 86E can then be energised only if one of the electromagnets 86P of the punching device is energised by scanning of a perforation in the card column which is under the brushes of the reading station.

FIGURES 19 and 20 show the circuits co-operating for controlling the tabulation, the reproduction of data and the ejection of cards, either by manual control or under the control of the programme.

The circuit arrangement of FIGURE 19 comprises circuits controlled by the cam-operated contacts CT1 and CA2 already mentioned with reference to FIGURES 17A and 17B, and the card lever contact LCP of the punching station. The cam of the contact CT1 is mounted on the shaft 114 (FIGURE 8) of the programme drum 15, while the cam of the contact CA2 is mounted on the shaft 163 (FIGURES 3 and 8). The escape contact 207, which is normally closed, is coupled (FIGURE 9A) to the escape pawl 94 which opens the said contact each time the said pawl is disengaged from the ratchet wheel 92. The contact LCP is closed by the presence of a card in the punching station. The contact of the switch PPR2 (FIGURE 19) is coupled to the switch PPR1 (FIGURE 18A) of the "programme" push button of the keyboard. The tabulation electromagnet 100 (FIGURE 19) is disposed in the escape mechanism illustrated in FIGURE 9A. The contact of the ejection control push button PEJ (FIGURE 19) is a push button of the keyboard. A switch PIM2 (FIGURE 19) for the manual insertion of cards is mechanically coupled to the switch PIM1 (FIGURE 17A) and to mechanical push button PIMEC (FIGURE 14) controlled together by the manual push button PIM which is on the machine (FIGURES 1 and 2). The set of brushes 17 for scanning the programme card 68 (FIGURE 2) comprises (FIGURE 19) the brushes b9, b8, b7, b6, b5, b4 and b3, which are arranged to scan the corresponding recording lines of the said programme card in co-operation with the yoke 41 (FIGURE 19). Contacts of relays energised through brushes scanning a programme card are arranged to form a decoding circuit (pyramid) (FIGURE 19).

The yoke 41 for scanning the programme card may be supplied with current from the positive pole through the contacts CT1 (FIGURES 17A, 17B and 19), LCP (in the punching station) and CA2 (FIGURE 17B), through the closed escape contact 207 and the contact 470 (in the "off" position) of the relay 370 (FIGURE 19). When the yoke 41 has been supplied, relays connected to the brushes may be supplied through perforations in the programme card. The relay 444 and its contact 344 have the object of delaying the transmission of the scanning current from the decoding pyramid in order that any of the contacts of the relays 340, 341, 301, 302 and 315 which might be energised may all be actuated before the current is applied to the said contacts. The relay 342, which may be fed through the diodes D8 or D9, is also illustrated in FIGURES 18A and 19. The relay 336 controls the contact 436 (FIGURE 18) already referred to. The relay 339 (brush 4, FIGURE 19) closes the contacts 439 (FIGURE 18A) and, when energised, brings about the return of the controlled return selection circuit SRC, which stops the automatic reproduction from a pulse transmitted by the closing of CR1. When the switches PPR1 (FIGURE 18A) and PPR2 (FIGURE 19) are in the position $\overline{P}$, the relay 370 is energised and its contact 470 is open and prevents the feeding of the programme device. If, in this case, the "punching" control push button is depressed (contacts 1PER and 2PER coupled, FIGURE 18A) in order to initiate the controlled reproduction, the latter starts as previously indicated and continues automatically throughout the time when the "punching" control push button (on the keyboard) is maintained in the depressed position, because, as from the release of this push button, the contact 2PER closes and permits the passage of a pulse from CR1 which controls the return of SRC.

The tabulation control, i.e. the passage by skipping from one card column to the succeeding card column, determined by the programme, may initiated either by depression of the key TAB (FIGURE 19) which is on the keyboard, or automatically by scanning of a perforation 5 in the programme card, which brings about the energisation of the relays 340 and 341, which close their contacts. Closing of the contact 441 produces energisation of 337, which closes the contact 437 in parallel with the tabulation control key TAB. Under these conditions, the contact PIM2 of the control switch for manual insertion being in position $\overline{IM}$ (non-manual insertion) (FIGURE 19), the contact 408 being in the "off" position (non-reproduction), the relay 313 is energised, as also is the relay 324, through the contact 428, the latter being in the "off" position, and the relay 328 not being energised. The energised relay 313 changes over its contact 413 (FIGURE 18A) and energises the controlled return selection circuit SRC for validating a pulse of CR1 at the escape electromagnet 86E. The energisation of the relay 324 (FIGURE 19) closes the contact 424 and renders possible through the contact 438 in the "off" position:

(1) Holding of the relay 324,
(2) Energisation of the tabulation electromagnet 100 of the escape mechanism (FIGURES 9A and 19),
(3) Energisation of the relay 320, which changes over its contact 420 (FIGURE 18A) and energises the electromagnet 215 of the keyboard, the recording control keys of the keyboard thus being held fast during the tabulation, and
(4) Energisation of the relay 369, of which the contact 469 then shunts the contact 207 of the escape (FIGURES 9A and 19). The tabulation (jump) proceeds until the scanning of a perforation 4 (in the programme), by which the relay 338 is energised and changes over its contact 438, which interrupts the holding of the tabulating electromagnet 100, or continues until the arrival of a card in the last colmn.

The ejection control is effected either by actuation of the "ejection" key of the keyboard, which closes the contact PEJ (FIGURE 19) or by the relay 351 (FIGURE 17A) energised by CT2 (contact 450 being in the "off" position) and which closes its contact 451 (FIGURE 19) when a card arrives in the last column (see above). The closing of the contact PEJ for the ejection energises the relays 325, 327 and the relay 321 through the normally closed contact 426. The relay 325 closes the contact 425, which then maintains the group of relays in the energised condition through the closed contact CT1. The relay 321 closes its contact 421 in parallel with the contact of the tabulation control push button TAB and initiates the tabulation (see above). The reading of a perforation 4, in the end-of-zone code in the programme card, energises the relay 338 (FIGURE 19), which changes over its contact 438, through which the relay 326 is energised and opens its contact 426. Consequently, the reading of an end-of-zone code produces:

(1) De-energisation of the tabulating electromagnet 100 of the escape device. and (2) De-energisation of the relay 321, which releases its contact 421.

The cards are then stopped in the column which succeeds the column of the end-of-zone code in the programme card. If this succeeding column contains in the programme card a "reproduction" code, the zone is normally dealt with. If this zone contains no reproduction code, the relay 338 is not energised and the contact 438 returns into its "off" position and de-energises the relay 326, of which the contact 426 closes again in the normal position and energises the relay 321, which closes its contact 421 for the tabulation.

When the switch PPR2 controlling the starting and stopping of the "programme" is in the position P̄, i.e. the "stop" position, the relay 328 (FIGURE 19) is energised and its contact 428 is changed over into the operative position. Under these conditions, depression of the "tabulation" control key TAB energises the relay 322 through the contact 427 in the normal position. Energisation of the relay 322 opens the contact 422 and prevents the passage of a pulse coming from CR1 (FIGURE 18A), which controls the return of SRC. On the other and, since the relay 324 is not energised, the contact 424 is open and the electromagnet 100 of the escape mechanism is not energised. Under these conditions, a column jump is obtained by spacing repetition (escape), while the tabulation key TAB is maintained in the depressed condition.

The relay 327 which controls the contact 427 has the object of validating the ejection when the "programme" switch PPR2 is in the position P̄.

In order momentarily to cancel the automatic reproduction in predetermined zones and to enable constant changes to be made in these zones, the keyboard is provided with three push buttons PR1, PR2 and PR3 (FIGURE 20) which each correspond to one particular card zone. The reproduction may then be controlled by the programme code or codes 5, 6 or 7 which, by way of three outputs S1, S2 or S3 of the decoding pyramid (FIGURE 19), can control the reproduction by means of the corresponding inputs E1, E2 or E3 (FIGURE 20). It will be assumed by way of example that the automatic reproduction in the zone 2 of the cards is to be automatically prevented after depression of the push button PR2 (FIGURE 20). Closing of the contact PR2 energises the relays 358 and 359, the feeding of which through PPR2 is maintained by 459 (FIGURES 19 and 20) in the position P (programme). When the pyramid for the decoding of the scanning of perforations in the programme cards sends a control pulse through S2 along the channel E2, the contact 458 being changed over into the operative position by its relay 358, this pulse is transmitted to the relay 360, which is energised and changes over the contact 460, by which the relay 359 was energised, in order to ensure holding by the contact 459. The relay 358 is maintained in the energised condition by the changed-over contact 460 as long as the operation is confined to this column (suspension of automatic reproduction permits recording of constants by manual control at the keyboards). The operation of suspending automatic reproduction is identical for the card zones checked by PR1 or PR2.

In order to illustrate an example of the general operation of the machine, there will be considered in the following, with reference to the graph accompanying FIGURES 10A and 10B, a succession of operations concerning the recording of data from the keyboard, followed by automatic reproduction under the control of the programme, cards 5 to be processed being in the magazine 6 (FIGURES 2 and 10B) and cards also being in the processing positions in the path. As regards the details of the functions involved in the successive operations considered in this example, attention is drawn to the explanations which have been given in the foregoing regarding the construction and operation of the various parts of the machine.

The operations are started by a first depression of the ejection push button PEJ (FIGURE 19) which, in the keyboard, controls the energisation of the electromagnets C58 and C51 which (FIGURE 8) control respectively the operation of the single-turn clutches of the card ejection and supply mechanisms of the machine. A card is then extracted from the magazine by the knife mechanism, and fed at the end of a first cycle (from T0 to T1) into the first waiting position 1ATT (FIGURE 10B), while a card leaving the punching station 8 is transmitted to the reading station 10 and a card leaving the said reading station is transmitted to the ejection compartment 11, in which it is taken up by the helices 193 and 194 (FIGURE 10A) and inserted into the stack PE. The graph of FIGURE 10B shows at DCT the movement of the knife 27 in the course of a supply cycle.

A second depression of the "ejection" button brings the card extracted from the magazine, from the first waiting position 1ATT to a second waiting position 2ATT at the end of the second cycle (from T1 to T2).

A third depression of the "ejection" button advances the card from the second waiting position 2ATT and positions it at CDP in the punching station 8, with its first column COL1 under the row of punches, while the preceding card is simultaneously transferred from the punching position to the reading position, in which it is positioned at CDL with its first column under the row of reading brushes BR. From this instant, the card positioned in the punching station may, in the absence of a special indication in the programme card, receive indications either by control of a numerical key of the keyboard for recording a chosen indication, or by automatic reproduction of an indication supplied by scanning of the corresponding column of the preceding card (in the reading station), by depression of the "punching" push button PER of the keyboard, and likewise for the succeeding columns. If, for example, the programme card bears an indication 7 in the column 3, this indication initiates the automatic reproduction of the data scanned in the card passing under the reading station, from this column until the scanning of a perforation 4 (for example in the column 4) in the programme card, which also brings about stoppage of the automatic reproduction and the positioning in column 5 (COL5) of the cards in the punching station and in the reading station. This could be followed by operations of recording, reproduction or tabulation as previously described. It is also possible to bring about the engagement and positioning of the succeeding card in the punching station by depressing the ejection key, which function may also be automatically performed by scanning of a perforation 5 in the programme card. The track may also be emptied by suspending the supply of cards by means of the supply push button, which brings the contact CPAM (FIGURE 17A) from the position ALIM to the position $\overline{\text{ALIM}}$, and then depressing the "ejection" push button as many times as necessary (twice) for emptying the visible track, it being possible, however, for the cards which are in the track to be processed either by means of the keyboard or by automatic control by means of the programme card.

In the diagram of FIGURES 10A and 10B, the duration of a card supply cycle during which a card is extracted from the magazine and brought to the waiting position 1ATT is represented from the time T0 to the time T1 and then from the time T1 to the time T2 by a time of 800 milli-seconds per cycle. At each supply cycle, the wheel 48 (FIGURE 8), which is fast with the cams 31 and 32 (FIGURE 10B), performs one revolution under the action of the motor 23 through the clutches C58 and C51 (FIGURE 8). During a third (supply) cycle, from the time T2 to the time T3, cards are first engaged in the processing stations (punching and reading) under the action of the movable rollers 121 and 73, of the intermediate stations IP, from the time T2 to the time T3 under the control of the mechanism of FIGURE 16, and then returned, from the time T3 to the time T4, against the registration abutments 126 and 84 by the registration levers 125 and 83 actuated by the registration mechanism (FIGURES 12 and 13). The movements of the cards in the precise stations PP, from the time T5, are controlled, for example, from the time T2 to the time T3, by the discs 110 and 90, as a result of the movement towards them of the movable rollers 127 and 91, which are all under the control of the mechanism of FIGURE 14. The cams controlling these three mechanisms, as also the ejection of the cards, are keyed on the shaft 163, which is driven by the motor 23 through the single-turn clutch C58 (FIGURE 8).

The cards are driven through the precise stations by the discs 110 and 90, by way of the friction coupler 93 and under the control of the escape mechanism illustrated in FIGURES 9A and 9B. The time PC (FIGURE 10B) corresponds to the duration of a punching cycle, i.e. 40 milliseconds, during which the shaft 20 which actuates the punching mechanism (FIGURES 10A-10B) performs one revolution.

This shaft also actuates the escape mechanism (FIGURE 9A) and supports the cams of the cam-operated contacts CR1, CR2, CR3 and CR4 (FIGURE 18B). The right-hand part EL of the graph (FIGURE 10B) represents the movement of the trailing edge of a card continuously driven by the "freewheeling" escape mechanism. The line ELA represents the movement of the leading edge of the same card in the machine, and the line ELS represents the continuation of the movement of the leading edge of this card until it arrives in the ejection compartment 11.

I claim:
1. In a machine for punching record cards, a card supply magazine, a first card track portion situated close to an outlet card throat passage of the said magazine, a punching station, a second card track portion arranged to conduct cards to the said punching station, the planes of the said first and second card track portions being substantially inclined at the same angle but in opposite directions in relation to a common reference plane and being disposed substantially at a right angle in relation to one another, a curvilinear connecting portion providing a helical card path and disposed between the said first and second card track portions in order that the latter may form a single continuous track, motor driving means, card extraction means which may be coupled to the said driving means in order to advance a card from the said magazine one at a time, so that the leading edge of the said card is stopped close to the said connecting portion in a first intermediate stopping position and card advance means situated at the beginning of the said second track portion and adapted to be coupled to the said driving means in order continuously to advance a card from the first intermediate stopping position to a second intermediate stopping position situated in front of the said punching station.

2. In a machine as claimed in claim 1, the card extraction means and the card advance means situated at the output of the card magazine are so controlled in an extraction cycle that one card remains partially engaged by its rear portion in the card magazine when it is extracted and stopped in the first intermediate stopping position.

3. In a machine as claimed in claim 2, when a card is advanced from the first waiting position to the second waiting position in the intermediate position, the advance means stop the leading edge of the said card in immediate proximity to the punching position, while the rear of the said card remains partly engaged in the curved direction-changing passage.

4. In a machine as claimed in claim 3, when a card is stopped in the second waiting position of the intermediate position, the said card is retained in the said waiting position as long as a card preceding it in the track is engaged in the punching position.

5. In a machine as claimed in claim 1, the card track portions and the curvilinear connecting portion are provided with auxiliary card driving means consisting of driving rollers arranged and adapted to advance, and to retain in various positions of the machine, record cards of small length which comprise a number of columns smaller than the number of columns in standard cards, the means for the coordination of the advance of the cards being so designed that the leading edge of the cards of small length is stopped in the machine in the same locations as the leading edge of standard cards.

References Cited by the Examiner
UNITED STATES PATENTS

| | | | |
|---|---|---|---|
| 3,070,204 | 12/1962 | Bradshaw | 271—5 X |
| 3,138,322 | 6/1964 | Orlando | 83—281 X |
| 3,160,411 | 12/1964 | Fiehl | 271—10 X |

M. HENSON WOOD, JR., *Primary Examiner.*

ALLEN N. KNOWLES, *Examiner.*